(12) United States Patent
Kawasaki

(10) Patent No.: US 7,848,884 B2
(45) Date of Patent: Dec. 7, 2010

(54) COLLISION PREDICTION APPARATUS

(75) Inventor: Tomoya Kawasaki, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1209 days.

(21) Appl. No.: 10/855,465

(22) Filed: May 28, 2004

(65) Prior Publication Data

US 2005/0033516 A1 Feb. 10, 2005

(30) Foreign Application Priority Data

May 30, 2003 (JP) ............................. 2003-154422

(51) Int. Cl.
*G08G 1/16* (2006.01)
*B60T 7/12* (2006.01)
*G05G 1/02* (2006.01)

(52) U.S. Cl. ................... 701/301; 701/300; 701/44; 701/96; 701/98; 701/200; 701/97; 340/436; 340/435; 340/438; 340/903; 180/232; 180/271; 180/274

(58) Field of Classification Search ............... 340/436, 340/435, 438, 903; 701/301, 300, 44, 96, 701/98, 200; 180/232, 271

See application file for complete search history.

(56) References Cited

U.S. PATENT DOCUMENTS

| | | | | |
|---|---|---|---|---|
| 5,541,590 | A * | 7/1996 | Nishio | 340/903 |
| 5,699,040 | A | 12/1997 | Matsuda | |
| 5,878,362 | A * | 3/1999 | Sekine et al. | 701/41 |
| 6,233,519 | B1 | 5/2001 | Yamada | |
| 6,311,123 | B1 * | 10/2001 | Nakamura et al. | 701/96 |
| 6,370,461 | B1 * | 4/2002 | Pierce et al. | 701/45 |
| 6,405,132 | B1 | 6/2002 | Breed et al. | |
| 6,438,491 | B1 * | 8/2002 | Farmer | 701/301 |
| 6,624,782 | B2 | 9/2003 | Jocoy et al. | |

(Continued)

FOREIGN PATENT DOCUMENTS

CN 1069761 C 8/2001

(Continued)

OTHER PUBLICATIONS

European Search Report, dated Aug. 24, 2007.

(Continued)

*Primary Examiner*—Thomas G Black
*Assistant Examiner*—Christine M Behncke
(74) *Attorney, Agent, or Firm*—Finnegan, Henderson, Farabow, Garrett & Dunner, LLP

(57) ABSTRACT

A collision prediction ECU of a collision prediction apparatus estimates a state of presence of a detected front obstacle. At this time, the collision prediction ECU estimates the state of presence on the basis of road shape data supplied from a navigation ECU of a navigation apparatus. Further, the collision prediction ECU checks and corrects the calculated road gradient value. At this time, the collision prediction ECU corrects the gradient value on the basis of road gradient data supplied from the navigation ECU. Further, the collision prediction ECU changes a collision avoidance time on the basis of travel environment data supplied from the navigation ECU. Moreover, the collision prediction ECU obtains an ETC gate pass-through signal from the navigation ECU and determines whether the vehicle is passing through the gate. The collision prediction apparatus performs collation prediction on the basis of the corrected values.

16 Claims, 10 Drawing Sheets

U.S. PATENT DOCUMENTS

| | | |
|---|---|---|
| 6,658,336 B2 | 12/2003 | Browne et al. |
| 6,662,108 B2 | 12/2003 | Miller et al. |
| 6,977,630 B1 | 12/2005 | Donath et al. |
| 7,031,496 B2 | 4/2006 | Shimano et al. |
| 7,124,027 B1 * | 10/2006 | Ernst et al. .................. 701/301 |
| 2001/0040505 A1 * | 11/2001 | Ishida et al. ................ 340/435 |
| 2002/0014988 A1 * | 2/2002 | Samukawa et al. ............ 342/70 |
| 2002/0019697 A1 | 2/2002 | Cong et al. |
| 2002/0099485 A1 | 7/2002 | Browne et al. |
| 2003/0004644 A1 | 1/2003 | Farmer |
| 2003/0106732 A1 | 6/2003 | Watanabe et al. |
| 2005/0052462 A1 | 3/2005 | Sakamoto et al. |

FOREIGN PATENT DOCUMENTS

| | | |
|---|---|---|
| CN | 1078549 C | 1/2002 |
| CN | 1335929 A | 2/2002 |
| EP | 0 840 138 A1 | 5/1998 |
| JP | 47 44631 | 12/1972 |
| JP | 04-213200 | 8/1992 |
| JP | 04-245600 | 9/1992 |
| JP | 05-174296 | 7/1993 |
| JP | 07-257301 | 10/1995 |
| JP | 09-304102 | 11/1997 |
| JP | 11-222055 | 8/1999 |
| JP | 11-263190 | 9/1999 |
| JP | 2000-142321 | 5/2000 |
| JP | 2000-247210 | 9/2000 |
| JP | 2001-014597 | 1/2001 |
| JP | 2001-331787 | 11/2001 |
| JP | 2002-019485 | 1/2002 |
| JP | 2002-067844 | 3/2002 |
| JP | 2002-092787 | 3/2002 |
| JP | 2002-238101 | 8/2002 |
| JP | 2002-331882 | 11/2002 |
| JP | 2003-099890 | 4/2003 |
| JP | 2003-141698 | 5/2003 |
| JP | 2003-146162 | 5/2003 |
| WO | WO 2005/118348 A1 | 12/2005 |

OTHER PUBLICATIONS

Japanese Official Action dated Aug. 8, 2007.
Japanese Official Action dated Jan. 9, 2007.
Chinese Office Action dated Jan. 6, 2006.
European Search Report dated Dec. 30, 2004.
Partial European Search Report dated Sep. 20, 2004.
Office Action for Japanese Patent Appl. No. 2007-260780 issued on Mar. 30, 2010.

\* cited by examiner

COLLISION PREDICTION APPARATUS

BACKGROUND OF THE INVENTION

1. Field of the Invention

The present invention relates to a collision prediction apparatus which predictively determines a collision between a vehicle, on which the collision prediction apparatus is mounted, and an obstacle in front of the vehicle along a route of travel (hereinafter simply referred to as a "front obstacle").

2. Description of the Related Art

Conventionally, as disclosed in, for example, Japanese Patent Application Laid-Open (kokai) No. 11-263190, there has been known an occupant protection apparatus for a vehicle which operates on the basis of results of determination as to probability of occurrence of a collision. The disclosed collision prediction apparatus acquires predetermined data items, such as position information and vehicle speed information, as information pertaining to the vehicle, and determines the probability of occurrence of a collision of the vehicle on the basis of the predetermined data items. When the probability of occurrence of a collision (hereinafter may be referred to as "collision probability") becomes high, the predetermined data items are transmitted to a counterpart vehicle with which the vehicle may collide, to thereby secure reliable operation of an occupant protection apparatus of the counterpart vehicle.

Further, as disclosed in, for example, Japanese Patent Application Laid-Open (kokai) No. 2000-142321, there has been known an occupant protection supporting apparatus which monitors the travel conditions of a vehicle and the surrounding environment, and operates on the basis of the results of monitoring. This occupant protection supporting apparatus monitors the travel conditions of the vehicle and the surrounding environment by use of a radar for detecting inter-vehicle distance, a G sensor for detecting deceleration, and an image detecting device. The occupant protection supporting apparatus processes the monitoring results so as to predict the collision probability of the vehicle. On the basis of the results of the prediction, the occupant protection supporting apparatus operates an occupant protection apparatus or a warning device, or performs communications for requesting assistance after occurrence of an accident.

Furthermore, as disclosed in, for example, Japanese Patent Application Laid-Open (kokai) No. 2000-247210, there has been known an occupant protection apparatus for a vehicle which executes a predetermined operation upon reception of a collision prediction signal. This occupant protection apparatus for a vehicle checks, on the basis of a detection signal from an ultrasonic sensor, an infrared sensor, a radar, or the like, whether an obstacle is present in front of the vehicle, or whether an approaching moving object is present behind the vehicle; and determines whether the obstacle or the moving object will collide with the vehicle. In response to a front collision prediction signal or a rear collision prediction signal, which is generated when the collision probability is determined to be high, the occupant protection apparatus restricts an occupant's specific operation, to thereby ensure reliable operation of the occupant protection apparatus.

Each of the above-mentioned conventional apparatuses determines the collision probability by utilizing data output from respective detection devices as they are, as data (parameters) used to determine the collision probability, without checking whether detection is performed properly or erroneously. In some cases, the occupant protection (supporting) apparatus may erroneously recognize a collision object, depending on the shape of a road on which the vehicle travels and the environment surrounding the vehicle (e.g., a tunnel or an iron bridge). In such a case, the occupant protection (supporting) apparatus may perform a useless operation. Therefore, demand has arisen for further improvement in the accuracy of collision determination by accurately recognizing a collision object; in particular, a front obstacle present along a route of travel of a vehicle.

SUMMARY OF THE INVENTION

The present invention was accomplished so as to cope with the above-described problems, and an object of the present invention is to provide a collision prediction apparatus for a vehicle which can accurately recognize a front obstacle that is highly likely to collide with the vehicle, to thereby improve the accuracy of predictive collision determination.

The present invention provides a collision prediction apparatus mounted on a vehicle, the collision prediction apparatus comprising front obstacle detection means for detecting a front obstacle present on a route of travel of the vehicle and adapted to predictively determine whether the vehicle will collide with the detected front obstacle as a result of traveling of the vehicle. The collision prediction apparatus further comprises: road information acquisition means for acquiring road information regarding a road from a navigation apparatus mounted on the vehicle; presence state estimation means for estimating, on the basis of the road information, a state of presence of the front obstacle detected by the front obstacle detection means; and predictive collision determination means for predictively determining whether the vehicle will collide with the front obstacle whose state of presence has been estimated.

The present invention provides another collision prediction apparatus mounted on a vehicle, the collision prediction apparatus comprising front obstacle detection means for detecting a front obstacle present on a route of travel of the vehicle and adapted to predictively determine whether the vehicle will collide with the detected front obstacle as a result of traveling of the vehicle. The collision prediction apparatus further comprises: road information acquisition means for acquiring road information regarding a road from a navigation apparatus mounted on the vehicle; presence state estimation means for estimating, on the basis of the road information, a state of presence of the front obstacle detected by the front obstacle detection means; parameter value detection means for detecting a parameter value representing a state of traveling of the vehicle; parameter value correction means for correcting, on the basis of the road information, the parameter value detected by the parameter value detection means; and predictive collision determination means for predictively determining whether the vehicle whose state of traveling is represented by the corrected parameter value will collide with the front obstacle whose state of presence has been estimated.

The present invention provides another collision prediction apparatus mounted on a vehicle, the collision prediction apparatus comprising front obstacle detection means for detecting a front obstacle present on a route of travel of the vehicle and adapted to predictively determine whether the vehicle will collide with the detected front obstacle as a result of traveling of the vehicle. The collision prediction apparatus further comprises: road information acquisition means for acquiring road information regarding a road from a navigation apparatus mounted on the vehicle; parameter value detection means for detecting a parameter value representing a state of traveling of the vehicle; parameter value correction means for correcting, on the basis of the road information, the parameter value detected by the parameter value detection means; and predictive collision determination means for predictively determining whether the vehicle whose state of traveling is represented by the corrected parameter value will collide with the front obstacle detected by the front obstacle detection means.

By virtue of these configurations, in each of the collision prediction apparatuses, road information can be acquired from the navigation apparatus mounted on the vehicle, by use of the road information acquisition means. Further, the state of presence of the detected front obstacle can be estimated on the basis of the acquired road information by use of the presence state estimation means. Therefore, each of the collision prediction apparatuses can accurately estimate the state of presence of the front obstacle; e.g., the state in which the front obstacle is present on the road surface, on the basis of the acquired road information. Accordingly, the collision prediction apparatus can accurately select a collision object with which the vehicle is highly likely to collide, without erroneously recognizing the front obstacle as a collision front object.

Further, the parameter value detected by the parameter value detection means can be collected on the basis of the road information. Therefore, the collision prediction apparatus can accurately grasp the state of traveling of the vehicle. Moreover, the predictive collision determination means can predictively determine whether the vehicle will collide with the front obstacle, on the basis of the front obstacle whose state of presence has been estimated and the corrected parameter value. Accordingly, the collision prediction apparatus can predictively determine occurrence of a collision on the basis of the accurate state of traveling of the vehicle and a front obstacle with which the vehicle is highly likely to collide, to thereby perform predictive collision determination with higher accuracy.

Another feature of the present invention resides in that the road information acquired by the road information acquisition means is road shape information representing a shape of the road; the presence state estimation means estimates a heading direction of the front obstacle on the basis of the road shape information when the presence state estimation means estimates that the state of presence of the front obstacle detected by the front obstacle detection means is a movable state; and the predictive collision determination means predictively determines whether the vehicle will collide with the front obstacle, by use of the estimated heading direction of the front obstacle.

Another feature of the present invention resides in that the road information acquired by the road information acquisition means is road shape information representing a shape of the road; the parameter value correction means corrects, on the basis of the road shape information, a parameter value regarding a heading direction of the vehicle; and the predictive collision determination means predictively determines whether the vehicle will collide with the front obstacle, the state of traveling of the vehicle being represented by the corrected parameter value regarding the heading direction.

In this case, the parameter value regarding the heading direction of the vehicle is preferably at least one of a parameter value representing a turning direction of the vehicle and a parameter value representing an inclination direction of the vehicle. Preferably, the road shape information includes information regarding a curved road. Further, the road shape information includes information regarding a gradient of a road. Preferably, the predictive collision determination means predictively determines the manner of a collision between the vehicle and the front obstacle, in addition to predictively determining whether the vehicle will collide with the front obstacle.

By virtue of these configurations, in each of the collision prediction apparatuses, road shape information can be acquired from the navigation apparatus by use of the road information acquisition means. Further, when the state of presence of the front obstacle is a movable state, the heading direction of the front obstacle can be estimated by means of the presence state estimation means. Further, the parameter value regarding the heading direction of the vehicle can be corrected by means of the parameter value correction means. Therefore, each of the collision prediction apparatuses can accurately estimate the heading direction of the front obstacle, and predictively determine a collision while accurately correcting the heading direction of the vehicle. Accordingly, each of the collision prediction apparatuses can predictively determine occurrence of a collision between the vehicle and the front obstacle with very high accuracy.

The operation of the predictive collision determination means is not limited to mere predictive determination of the probability of occurrence of a collision between the vehicle and the front obstacle. That is, the predictive collision determination means can predictively determine occurrence of a collision on the basis of the front obstacle with which the vehicle is highly likely to collide and the accurate state of traveling of the vehicle. For example, a portion of the vehicle which collides with the front obstacle and the degree of damage (the manner of collision between the vehicle and the front obstacle) can be predictively determined with high accuracy.

Further, when the road shape information contains information regarding a curved road, the collision prediction apparatuses can acquire the information regarding a curved road by use of the road information acquisition means. Examples of the curved road information include a radius of curvature of the curved road and the number of lanes of the curved road. From these pieces of information, the collision prediction apparatus can more accurately estimate the heading direction of the front obstacle (e.g., the radius of curvature or the lane on which the front obstacle is present), and can more accurately correct the parameter value regarding the heading direction of the vehicle; i.e., the parameter value representing the turning direction of the vehicle.

Further, when the road shape information contains information regarding a gradient of a road, the collision prediction apparatuses can acquire the information regarding a gradient of a road by use of the road information acquisition means. Examples of the road gradient information include an amount of inclination and length of a road section. From the gradient information, the collision prediction apparatus can more accurately estimate the heading direction of the front obstacle (e.g., whether going down or going up a sloping road section), and can more accurately correct the parameter value regarding the heading direction of the vehicle; i.e., the parameter value representing the inclination direction of the vehicle.

Another feature of the present invention resides in that the collision prediction apparatus further comprises travel-related-information acquisition means for acquiring, from the outside, travel-related information regarding travel conditions of the vehicle; and the parameter value correction means corrects the parameter value on the basis of not only the road information but also the travel-related information acquired by the travel-related-information acquisition means.

Another feature of the present invention resides in that the collision prediction apparatus further comprises occupant-protection-apparatus control means for starting operation of an occupant protection apparatus when the predictive collision determination means predictively determines that the vehicle collides with the front obstacle, the occupant protection apparatus including at least an apparatus mounted on the vehicle and adapted to avoid collision or an apparatus mounted on the vehicle and adapted to mitigate impact at the time of collision.

Another feature of the present invention resides in that the navigation apparatus mounted on the vehicle comprises at least present location detection means for detecting a present location of the vehicle, and storage means for storing the road information in a retrievable manner. Another feature of the present invention resides in that the front obstacle detection means is formed of a millimeter-wave radar which is provided at a front end portion of the vehicle and which detects the front obstacle on the basis of a period of time between transmission of a millimeter wave and receipt of the wave.

By virtue of these configurations, the collision prediction apparatuses can acquire the latest travel-related information from the outside (for example, an information providing center or a traffic information providing center) by use of the travel-related-information acquisition means. Examples of the travel-related information include information regarding traffic congestion or weather in a region where the vehicle is presently traveling. The parameter value correction means can correct the parameter value by use of the acquired latest travel-related information. Therefore, the parameter value correction means can correct the parameter value more accurately in accordance with the present conditions. In this case, the travel-related-information acquisition means may be incorporated in the navigation apparatus mounted on the vehicle, and the collision prediction apparatus may acquire the travel-related information therefrom. The occupant-protection-apparatus control means enables the occupant protection apparatus to be operated at an optimum timing on the basis of the result of the predictive collision determination. Moreover, when the front obstacle detection means is formed of a millimeter-wave radar which can be used by other apparatuses mounted on the vehicle, the manufacturing cost of the vehicle can be reduced.

The present invention provides another collision prediction apparatus mounted on a vehicle, the collision prediction apparatus comprising front obstacle detection means for detecting a front obstacle present on a route of travel of the vehicle and adapted to predictively determine whether the vehicle will collide with the detected front obstacle as a result of traveling of the vehicle. The collision prediction apparatus further comprises: travel environment information acquisition means for acquiring travel environment information regarding a travel environment of the vehicle from a navigation apparatus mounted on the vehicle; parameter value detection means for detecting a parameter value representing a state of traveling of the vehicle; predictive collision determination means for comparing the parameter value detected by the parameter value detection means and a predetermined collision determination reference value used for predictive determination of a collision of the vehicle with the front obstacle, and predictively determining that the vehicle will collide with the front obstacle when the parameter value reaches the predetermined collision determination reference value; and changing means for changing the predetermined collision determination reference value on the basis of the travel environment information acquired by the travel environment information acquisition means.

In this case, preferably, the travel environment information is travel environment information which represents a travel environment in which the front obstacle detection means detects a continuous stationary object present near the vehicle; and the changing means increases the predetermined collision determination reference value in accordance with the travel environment information. Preferably, the travel environment information is travel environment information which represents a travel environment in which the vehicle waits to make a right turn at an intersection; and the changing means increases the predetermined collision determination reference value in accordance with the travel environment information. Preferably, the travel environment information is travel environment information which represents a travel environment in which the vehicle travels on a highway; and the changing means decreases the predetermined collision determination reference value in accordance with the travel environment information. Preferably, the predetermined collision determination reference value is determined on the basis of a time necessary for avoiding collision between the vehicle and the front obstacle. Preferably, the collision prediction apparatus further comprises occupant-protection-apparatus control means for starting operation of an occupant protection apparatus when the predictive collision determination means predictively determines that the vehicle will collide with the front obstacle, the occupant protection apparatus including at least an apparatus mounted on the vehicle and adapted to avoid collision or an apparatus mounted on the vehicle and adapted to mitigate impact at the time of collision. Preferably, the navigation apparatus mounted on the vehicle comprises at least present location detection means for detecting a present location of the vehicle, and storage means for storing the travel environment information in a retrievable manner. Preferably, the front obstacle detection means is formed of a millimeter-wave radar which is provided at a front end portion of the vehicle and which detects the front obstacle on the basis of a period of time between transmission of a millimeter wave and receipt of the wave.

By virtue of these configurations, the collision prediction apparatus can acquire travel environment information regarding the travel environment of the vehicle from the navigation apparatus by use of the travel environment information acquisition means. Here, the term "travel environment" refers to environmental conditions including the conditions around a road on which the vehicle is traveling, and a travel pattern of the vehicle. The collision prediction apparatus can cause the predictive collision determination means to compare the detected parameter value that represent the state of traveling of the vehicle and the predetermined collision determination reference value to thereby predictively determine occurrence of a collision between the vehicle and the front obstacle. Further, the collision prediction apparatus can change the predetermined collision determination reference value on the basis of the acquired travel environment information by means of the changing means. Accordingly, the collision prediction apparatus can accurately select a front obstacle with which the vehicle is highly likely to collide, to thereby prevent erroneous determination in relation to predictive collision determination.

When the changing means acquires, during travel of the vehicle, travel environment information which represents a travel environment in which the front obstacle detection means detects a continuous stationary object present near the vehicle, the changing means can increase the predetermined collision determination reference value. An example of the continuous stationary object present near the vehicle is the wall of a tunnel. When the changing means acquires travel environment information which represents a travel environment in which the vehicle waits to make a right turn at an intersection, the changing means can increase the predetermined collision determination reference value.

By virtue of the operation of the changing means for increasing the predetermined collision determination reference value, the front obstacle can be made difficult to select, during the predictive collision determination, as a collision front object with which the vehicle is highly likely to collide. This reduces the number of operations for predictively determining occurrence of a collision between the vehicle and a front obstacle which is highly unlikely to collide with the vehicle, such as a statically object which is continuously detected by the front obstacle detection means, and other vehicles passing in front of the vehicle at the time of waiting to make a right turn. Accordingly, erroneous determination, which would otherwise occur in prediction of collision with these front obstacles, can be reduced greatly.

When the changing means acquires travel environment information which represents a travel environment in which the vehicle travels on a highway, the changing means decreases the predetermined collision determination reference value. By virtue of the operation of the changing means for decreasing the predetermined collision determination reference value, the front obstacle can be made easy to select, during the predictive collision determination, as a collision front object with which the vehicle is highly likely to collide. Thus, when the vehicle travels on a highway, a front obstacle with which the vehicle is highly likely to collide can be detected in an early stage, and the predictive collision determination can be performed properly. Accordingly, the occupant-protection-apparatus control means can operate the occupant protection apparatus at a proper timing on the basis of the results of the predictive collision determination.

The present invention provides another collision prediction apparatus mounted on a vehicle, the collision prediction apparatus comprising front obstacle detection means for detecting a front obstacle present on a route of travel of the vehicle, and predictive collision determination means for predictively determining whether the vehicle will collide with the detected front obstacle, on the basis of a predetermined collision determination reference value. The collision prediction apparatus further comprises: pass-through information acquiring means for acquiring pass-through information representing that the vehicle is passing through an automatic fee settlement site; pass-through information acquisition determination means for determining whether the pass-through information has been acquired by the pass-through information acquiring means; front obstacle determination means for determining whether the front obstacle detected by the front obstacle detection means is a stationary object existing generally in front of the vehicle and the distance between the vehicle and the front obstacle is equal to or less than a predetermined distance; and predictive determination prohibition means for prohibiting the predictive collision determination means from performing the predictive determination when the pass-through information is determined to have been acquired by the pass-through information acquiring means and when the front obstacle determination means determines that the front obstacle is a stationary object existing generally in front of the vehicle and the distance between the vehicle and the front obstacle is equal to or less than a predetermined distance.

In this case, preferably, the pass-through information is supplied from a navigation apparatus amounted on the vehicle. Preferably, the navigation apparatus comprises present location detection means for detecting a present location of the vehicle, and storage means for storing at least the location of the automatic fee settlement site in a retrievable manner, and supplies the pass-through information on the basis of the present location detected by the present location detection means and the location of the automatic fee settlement site stored in the storage means. Preferably, the collision prediction apparatus further comprises occupant-protection-apparatus control means for starting operation of an occupant protection apparatus when the predictive collision determination means predictively determines that the vehicle will collide with the front obstacle, the occupant protection apparatus including at least an apparatus mounted on the vehicle and adapted to avoid the collision or an apparatus mounted on the vehicle and adapted to mitigate impact at the time of the collision. Preferably, the front obstacle detection means is formed of a millimeter-wave radar which is provided at a front end portion of the vehicle and which detects the front obstacle on the basis of a period of time between transmission of a millimeter wave and receipt of the wave.

By virtue of the above configuration, the collision prediction apparatus can acquire pass-through information representing that the vehicle is passing through an automatic fee settlement site (ETC (Electrical Toll Collection System) gate) by means of the pass-through information acquiring means. When the collision prediction apparatus is configured to acquire the pass-through information from the navigation apparatus, separate provision of an apparatus for supplying the pass-through information becomes unnecessary. Further, by use of the front obstacle determination means, the collision prediction apparatus can determine whether the front obstacle detected by the front obstacle detection means is a stationary object existing generally in front of the vehicle and the distance between the vehicle and the front obstacle is equal to or less than a predetermined distance. Moreover, by use of the predictive determination prohibition means, the collision prediction apparatus can prohibit the predictive collision determination means from performing the predictive determination, on the basis of the results of the determination by the front obstacle determination means.

Thus, when the vehicle passes through an ETC gate, an ETC gate bar which is present in front of the vehicle so as to stop the vehicle can be detected. Here, the ETC gate bar is a stationary object (front obstacle) existing generally in front of the vehicle, and the distance between the vehicle and the front obstacle is equal to or less than a predetermined distance. Since collision prediction is prohibited as a result of the front obstacle being determined to be an ETC gate bar, an erroneous determination that the vehicle will collide with the ETC gate bar can be prevented, whereby the accuracy of the predictive collision determination can be improved.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
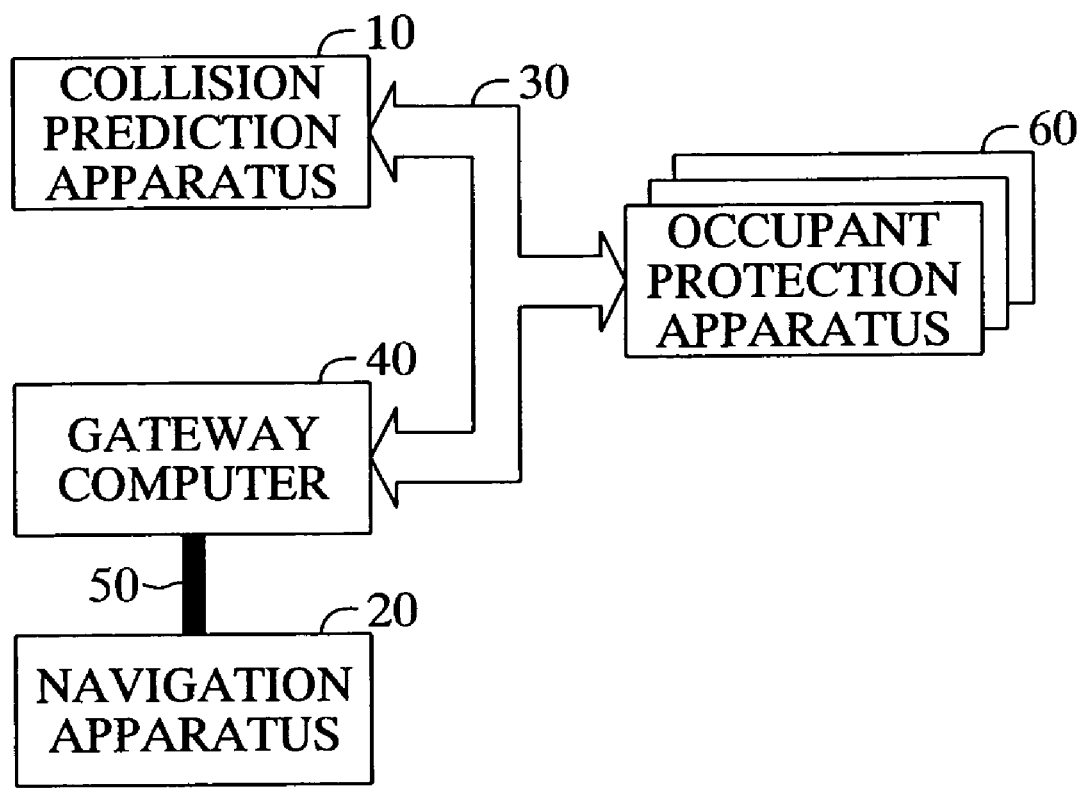
FIG. 1 is a block diagram schematically showing the overall configuration of a collision prediction system according to a first embodiment of the present invention.

A first embodiment of the present invention will now be described with reference to the drawings. FIG. 1 is a block diagram schematically showing the overall configuration of a collision prediction system according to the first embodiment, which system predictively determines a collision between a vehicle on which the collision prediction system is mounted and a front obstacle, and operates an occupant protection apparatus on the basis of the results of the predictive determination. The collision prediction system includes an collision prediction apparatus 10 which predicts a collision and determines the collision probability; and a navigation apparatus 20 which provides route guidance for a driver and supplies various types of information.

The collision prediction apparatus 10 and the navigation apparatus 20 are connected with each other in a communicable manner via a bus 30, a gateway computer 40, and a LAN (Local Area Network) 50. The gateway computer 40 is a computer which generally controls the flow of various data shared between the collision prediction apparatus 10 and the navigation apparatus 20 and the flow of control signals that control the operation linkage between these apparatuses 10 and 20. Moreover, an occupant protection apparatus 60, comprising an apparatus for avoiding collision of the vehicle and an apparatus for mitigating damage upon collision of the vehicle, among other apparatuses, is also connected to the bus 30.

Figure 2:
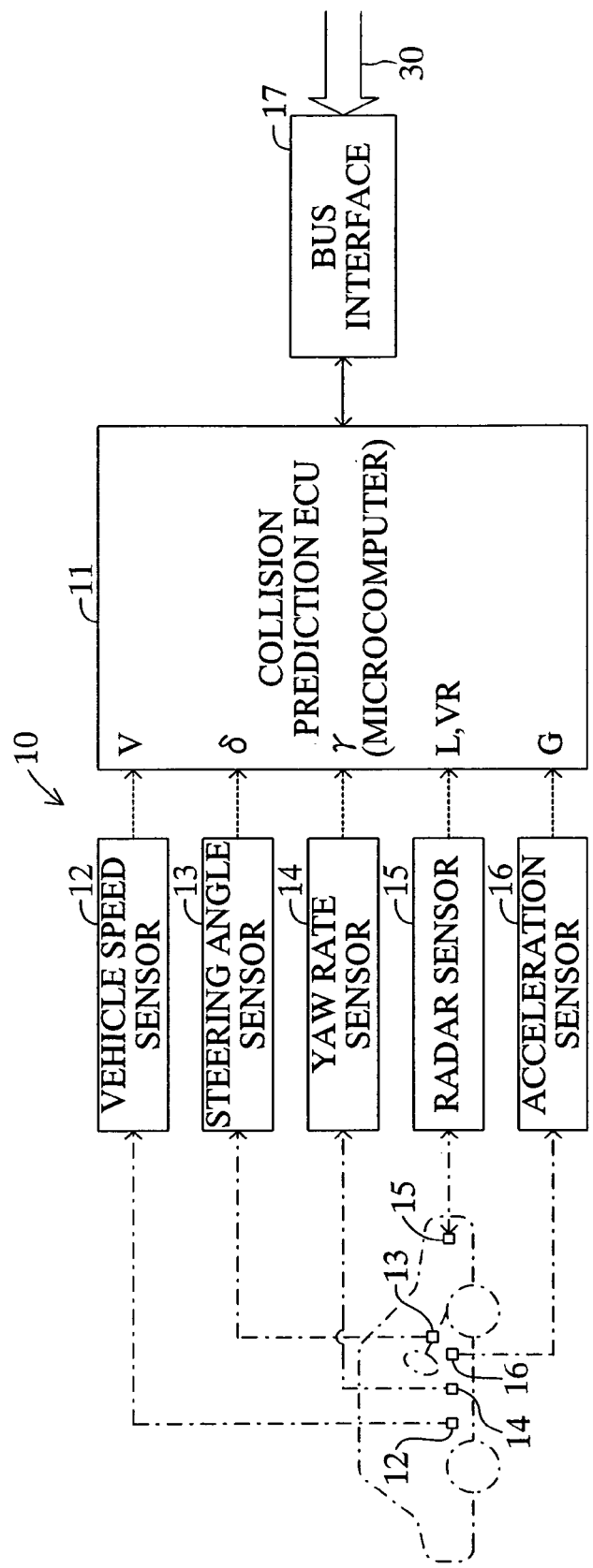
FIG. 2 is a block diagram schematically showing a collision prediction apparatus of FIG. 1.

As shown in FIG. 2, the collision prediction apparatus 10 includes a collision prediction electronic control unit 11 (hereinafter simply referred to as the "collision prediction ECU 11"). The collision prediction ECU 11 includes, as a main component, a microcomputer consisting of a CPU, ROM, RAM, a timer, etc. The collision prediction ECU 11 acquires various signals supplied from the navigation apparatus 20 and various sensors, and executes programs shown in FIGS. 4 to 8. Therefore, a vehicle speed sensor 12, a steering angle sensor 13, a yaw rate sensor 14, a radar sensor 15, and an acceleration sensor 16 are connected to the collision prediction ECU 11. Detection values output from these sensors are output to the bus 30 via a bus interface 17, which will be described later; thus, the navigation apparatus 20 and the occupant protection apparatus 60 can use the detection values.

The vehicle speed sensor 12 detects the vehicle speed V on the basis of a pulse signal whose pulse rate varies in accordance with the vehicle speed, and outputs a signal indicative of the detected vehicle speed V. The steering angle sensor 13 outputs a signal corresponding to the steering angle $\delta$ of the front wheels. The collision prediction ECU 11 detects the steering angle $\delta$ of the front wheels on the basis of the signal output from the steering angle sensor 13. The yaw rate sensor 14 detects the yaw rate $\gamma$ of the vehicle on the basis of a signal corresponding to the angular velocity of rotation around the center of gravity of the vehicle, and outputs a signal indicative of the detected yaw rate $\gamma$.

The radar sensor 15 is built in, for example, a front end portion of the vehicle (e.g., near the front grille). On the basis of a period of time between transmission of a millimeter wave and receipt of the wave, the radar sensor 15 detects and outputs a relative distance L indicative of the distance between the vehicle and a front obstacle which exists in a predetermined area in front of the vehicle, as well as a relative speed VR indicative of the speed of the vehicle relative to the front obstacle. Further, the radar sensor 15 detects the relative direction (upward, downward, leftward, rightward) of the front obstacle with respect to the vehicle, and outputs presence direction information indicating the direction of the front obstacle. The acceleration sensor 16 is provided at the approximate center of gravity of the vehicle. The acceleration sensor 16 detects the acceleration G in the vertical direction on the basis of a signal corresponding to the displacement velocity of the vehicle in the vertical direction, and outputs a signal indicative of the detected acceleration G.

Moreover, the bus interface 17 is connected between the collision prediction ECU 11 and the bus 30. The bus interface 17 supplies to the collision prediction ECU 11 various types of information from the navigation apparatus 20, and outputs to the navigation apparatus 20 and the occupant protection apparatus 60 various types of information and various detection values of the respective sensors 12, 13, 14, 15, and 16, which are supplied from the collision prediction ECU 11.

Figure 3:
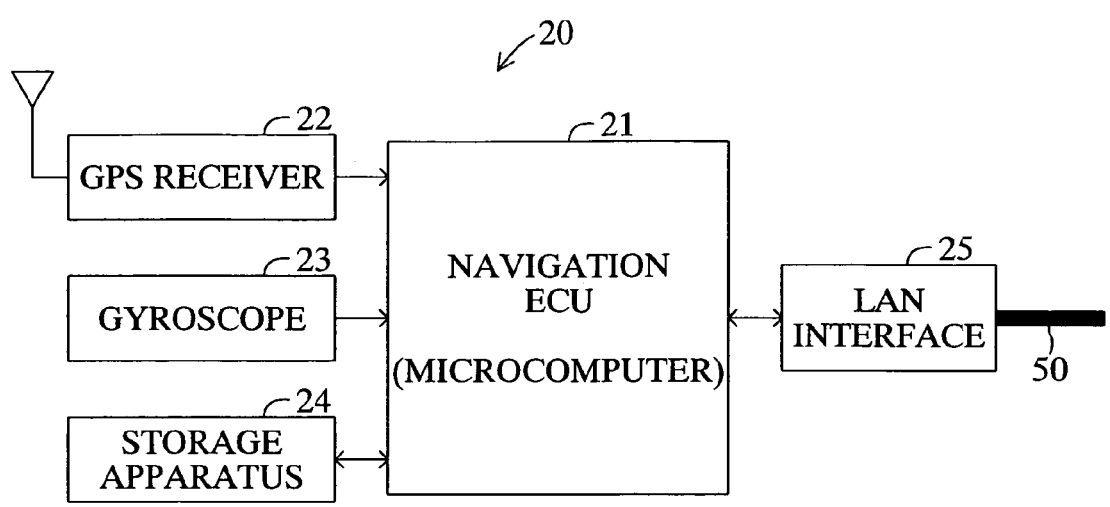
FIG. 3 is a block diagram schematically showing a navigation apparatus of FIG. 1.

As shown in FIG. 3, the navigation apparatus 20 includes a navigation electronic control unit 21 (hereinafter simply referred to as the "navigation ECU 21"). The navigation ECU 21 includes, as a main component, a microcomputer consisting of a CPU, ROM, RAM, a timer, etc. A GPS (Global Positioning System) receiver 22, a gyroscope 23, a storage apparatus 24, and a LAN interface 25 are connected to the navigation ECU 21.

The GPS receiver 22 receives from satellites radio waves for detecting the present location of the vehicle, and detects and outputs the present location of the vehicle in the form of, for example, coordinate data. The gyroscope 23 detects and outputs the turning speed of the vehicle for detecting the heading direction of the vehicle. The navigation ECU 21 detects the present location of the vehicle while obtaining the detection values output from the GPS receiver 22 and the gyroscope 23, as well as the vehicle speed V output from the vehicle speed sensor 12.

The storage apparatus 24 includes a recording medium, such as a hard disk, CD-ROM, or DVD-ROM, and a drive unit for the storage medium. The storage apparatus 24 stores unillustrated programs to be executed by the navigation ECU 21, and various data, including road data. The road data include road type data representing the road type of each road (highway, interstate route, state route, etc.); road environment data representing the environment around each road (tunnel, iron bridge, etc.); road shape data representing the shape of each road section (the number of lanes, the radius of curvature, etc.); road surface condition data representing the surface conditions of each road section (the friction coefficient μ of road surface, etc.); and road gradient data representing the gradient and length of each road section.

The LAN interface 25 is connected to the LAN 50 installed within the vehicle, and enables communications between the navigation ECU 21 and the gateway computer 40. Specifically, via the LAN 50, the LAN interface 25 supplies to the gateway computer 40 various types of information from the navigation ECU 21, and acquires from the gateway computer 40 various types of information supplied from the collision prediction apparatus 10 and supplies the same to the navigation ECU 21.

The occupant protection apparatus 60 consists of an apparatus for controlling the traveling state of the vehicle on the basis of the collision prediction by the collision prediction apparatus 10 so as to avoid collision of the vehicle, and an apparatus for mitigating damage to occupants at the time of collision of the vehicle. Examples of the occupant protection apparatus 60 include an apparatus for decreasing the speed of the vehicle; an apparatus for assisting the brake pedal depressing force of the driver; an automatic steering apparatus for automatically rotating the steering wheel so as to avoid collision; an apparatus for preventing advance movement of occupants at the time of collision; an apparatus for optimizing the operation of an air bag and the impact absorbing efficiency of the operated air bag; an apparatus for changing the impact energy absorption load; an apparatus for moving the operation pedals; and a cutoff circuit for stopping supply of electrical power to apparatuses other than the occupant protection apparatus 60 and the apparatus for controlling the traveling state of the vehicle.

The respective apparatuses which constitute the occupant protection apparatus 60 operate immediately before or immediately after the occurrence of a collision of the vehicle, and do not directly relate to the present invention. Therefore, detailed descriptions of operations of the respective apparatus are omitted in the present specification; however, their operations will be briefly described below.

The apparatus for decreasing the speed of the vehicle automatically operates the brake apparatus so as to decrease the speed of the vehicle when the relative distance or the relative speed with respect to a detected front obstacle falls outside a predetermined range, to thereby secure a proper relative distance or relative speed. The apparatus for assisting the brake pedal depressing force of the driver assists the depressing force of the driver (specifically, increases the brake hydraulic pressure and maintains the increased pressure) when the driver operates the brake pedal to stop the vehicle for avoidance of collision, to thereby reliably operate the brake apparatus of the vehicle. The automatic steering apparatus is an apparatus for automatically rotating the steering wheel so as to avoid collision; for example, an apparatus for assisting the steering operation of the driver for avoidance of collision or reliably rotating the steering wheel to a direction for avoidance of collision.

An example of the apparatus for preventing advance movement of occupants at the time of collision is a seat belt take-up apparatus. The seat belt take-up apparatus prevents an occupant from moving forward, which movement would otherwise occur because of inertia upon collision of the vehicle with a front obstacle. Specifically, upon detection of a collision of the vehicle, the seat belt take-up apparatus takes up the seat belt and locks the belt at the taken up position, to thereby prevent the seat belt from being pulled out further. Notably, in order to realize this function, there is implemented an apparatus for taking up and locking the sheet belt by use of an electric motor or compressed gas.

An example of the apparatus for optimizing the operation of an air bag and the impact absorbing efficiency of the operated air bag is a column moving apparatus for moving the steering column in accordance with whether the occupant wears the seat belt or in accordance with the physique (weight) of the occupant. The column moving apparatus is designed to move the steering column so as to change the distance between the driver and the steering wheel to a distance necessary for deployment of an air bag, to thereby efficiently absorb impact. In order to realize this function, there is implemented, for example, an apparatus for changing the angle of the steering column, an apparatus for changing the distance between the steering wheel and the driver, or an apparatus for moving the seat along the front/back direction.

An example of the apparatus for changing the impact energy absorption load is an impact energy absorbing apparatus for mitigating impact of the driver against the steering wheel through energy absorption upon deformation of the steering column. The impact energy absorbing apparatus is designed to operate when the driver collides with the steering wheel during a vehicle collision and properly mitigate the impact energy produced upon the collision, by energy absorption attained upon deformation of the steering column. In order to realize this function, there is implemented, for example, an impact energy absorbing apparatus which includes a conical pin inserted into the outer circumferential wall of the steering column by a predetermined amount and which utilizes a deformation resistance generated when the pin moves relative to the outer circumferential wall of the steering column, while tearing the wall.

An example of the apparatus for moving the operation pedals includes a pedal moving apparatus for moving the operation pedals toward the front of the vehicle immediately before occurrence of a vehicle collision or immediately upon occurrence of a vehicle collision. Upon detection of a vehicle collision, the pedal moving apparatus moves the operation pedals toward the front of the vehicle in order to avoid collision between the legs of the driver moved forward because of inertia and the operation pedals (e.g., an acceleration pedal, a brake pedal, etc.). Notably, in order to realize this function, there is implemented, for example, a pedal moving apparatus which, by means of drive force of an electric motor, moves the operation pedals or moves the acceleration pedal and the brake pedal at different timings.

The cutoff circuit for stopping supply of electrical power to apparatuses other than the occupant protection apparatus 60 and the apparatus for controlling the traveling state of the vehicle is a cutoff circuit which cuts off the supply of electrical power to apparatuses other than the occupant protection apparatus 60 and vehicle traveling control apparatuses (such as an ABS, a vehicle stability control apparatus, etc.) in order to preferentially supply electrical power to the occupant protection apparatus 60 and the vehicle traveling control apparatuses. That is, the cutoff circuit stops supply of electrical power to apparatuses which are not necessary for collision prediction and collision avoidance, such as audio equipment.

Next, operation of the collision prediction system according to the present embodiment having the above-described configuration will be described in detail. When an unillustrated ignition switch is activated, the collision prediction ECU 11 of the collision prediction apparatus 10 starts to execute a collision prediction program of FIG. 4 at predetermined short intervals.

The collision prediction ECU 11 starts the collision prediction program from step S10. In step S11, the collision prediction ECU 11 acquires the relative distance L between the front end of the vehicle and a front obstacle and the relative speed VR of the vehicle relative to the front obstacle, which are output from the radar sensor 15. The collision prediction ECU 11 stores the acquired relative distance L and relative speed VR, as a present relative distance Lnew and a present relative speed VRnew, respectively, where "new" indicates that these data are acquired through present execution of the program.

After storage of the present relative distance Lnew and the present relative speed VRnew, the collision prediction ECU 11 determines in step S12 whether the present relative speed VRnew is positive. When the present relative speed VRnew is not positive, the collision prediction ECU 11 makes a "No" determination in step S12, and proceeds to step S24 in order to end the program. When the present relative speed VRnew is not positive, this means that the relative distance L between the front end of the vehicle and the front obstacle does not change or increases. In this case, since the vehicle is unlikely to collide with the front obstacle, collision prediction is unnecessary.

When the present relative speed VRnew is positive, the collision prediction ECU 11 makes a "Yes" determination in step S12, and proceeds to step S13. In step S13, the collision prediction ECU 11 determines whether the absolute value $|\delta|$ of the steering angle $\delta$ detected on the basis of the output signal from the steering angle sensor 13 is greater than a preset steering angle $\delta s$. Through this determination, the collision prediction ECU 11 can determine whether the vehicle is currently traveling along a curved road section. That is, when the absolute value $|\delta|$ of the steering angle $\delta$ is not greater than the preset steering angle $\delta s$, the vehicle is not traveling along a curved road section, and therefore, the collision prediction ECU 11 makes a "No" determination and proceeds to step S16.

Meanwhile, when the absolute value $|\delta|$ of the steering angle $\delta$ is greater than the preset steering angle $\delta s$, the vehicle is traveling along a curved road section, and therefore, the collision prediction ECU 11 makes a "Yes" determination and proceeds to step S14. In step S14, the collision prediction ECU 11 executes a curved-road obstacle checking routine. This curved-road obstacle checking routine properly selects a front obstacle with which the vehicle is highly likely to collide, among front obstacles detected by the radar sensor 15, while excluding obstacles (e.g., a vehicles traveling in the opposite lane, and signboards disposed in the opposite lane) with which the vehicle is actually highly unlikely to collide, because the vehicle is traveling along a curved road.

Figure 5:
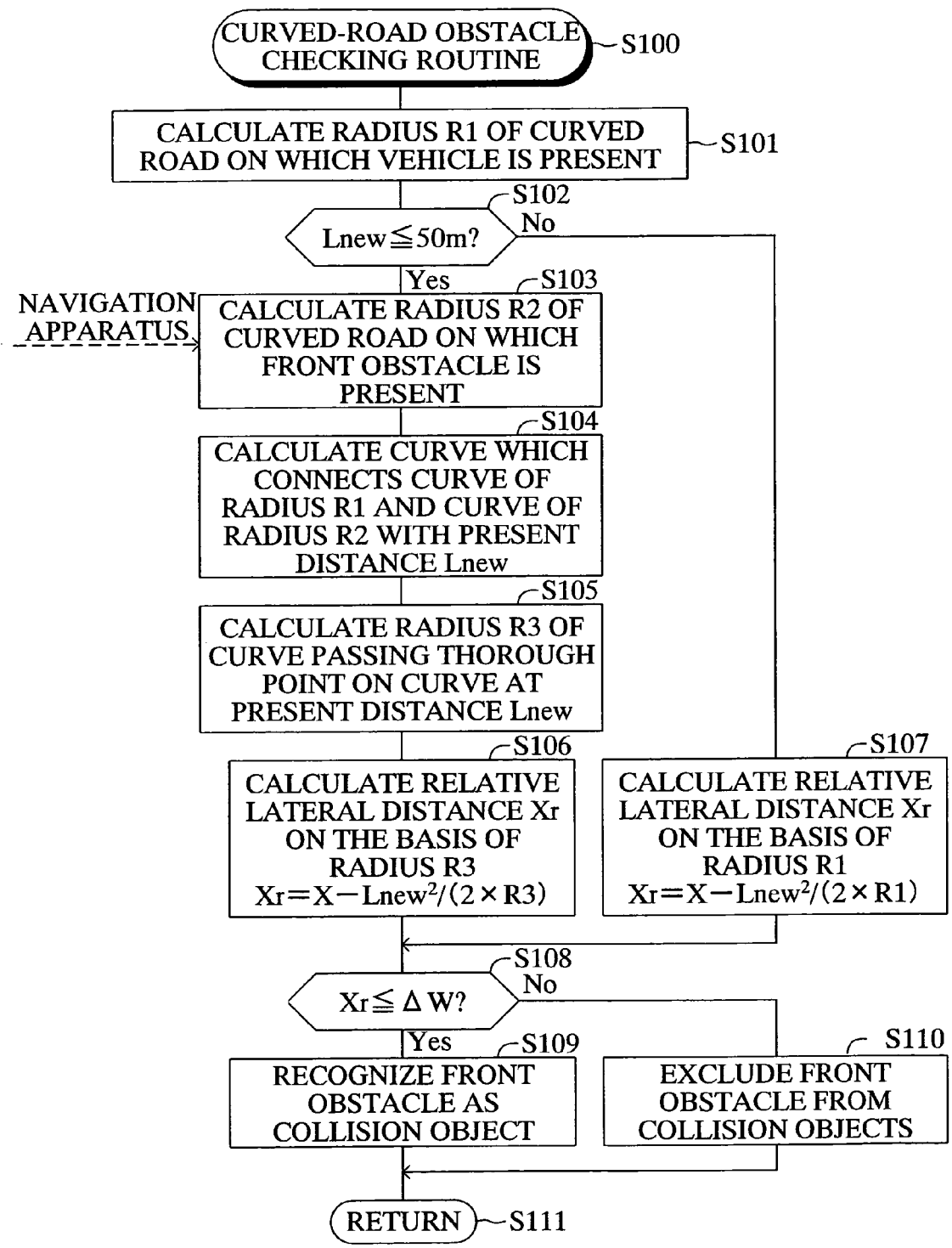
FIG. 5 is a flowchart showing a routine that the collision prediction ECU (microcomputer) of FIG. 2 performs in order to check the presence of an obstacle on a curved road.

As shown in FIG. 5, this curved-road obstacle checking routine is started from step S100. In step S101, the collision prediction ECU 11 calculates the radius of curvature R1 of a road section along which the vehicle is currently traveling. Specifically, the collision prediction ECU 11 calculates the radius of curvature R1 from the steering angle $\delta$ on the basis of the output signal from the steering angle sensor 13 and the yaw rate $\gamma$ from the yaw rate sensor 14, and proceeds to step S102.

In step S102, the collision prediction ECU 11 determines whether the relative distance between the vehicle and the front obstacle; i.e., the present relative distance Lnew, is not greater than a predetermined distance (e.g., 50 m). When the present relative distance Lnew is 50 m or less, the collision prediction ECU 11 makes a "Yes" determination, and proceeds to step S103. Meanwhile, when the present relative distance Lnew is greater than 50 m, the collision prediction ECU 11 makes a "No" determination, and proceeds to step S107. In the comparative determination of the present relative distance Lnew, the collision prediction ECU 11 may perform the determination for relative distance upon satisfaction of other conditions. For example, the collision prediction ECU 11 may perform the determination for relative distance when the present relative speed VRnew is not greater than 120 km/h, or when the time before collision between the vehicle and the front obstacle is 1.5 sec or less.

In step S103, the collision prediction ECU 11 estimates the radius of curvature R2 of a road section on which the front obstacle is present. Specifically, the collision prediction ECU 11 acquires from the navigation apparatus 20 road shape data and road surface condition data regarding the road section on which the front obstacle is present. Here, there will be described operation of the collision prediction ECU 11 for communicating with the navigation ECU 21 of the navigation apparatus 20 so as to obtain the road shape data and the road surface condition data. First, the collision prediction ECU 11 supplies the present relative distance Lnew (relative distance to the front obstacle) to the gateway computer 40 via the bus 30.

The gateway computer 40 supplies the supplied present relative distance Lnew to the navigation ECU 21 of the navigation apparatus 20 via the LAN 50. The navigation ECU 21 receives the present relative distance Lnew via the LAN interface 25, and temporarily stores it in unillustrated RAM. The navigation ECU 21 receives respective detection values from the GPS receiver 22, the gyroscope 23, and the vehicle speed sensor 12, and detects the present location and heading direction of the vehicle. The navigation ECU 21 determines the position of the front obstacle through utilization of the detected present location and heading direction of the vehicle and the stored present relative distance Lnew. Subsequently, the navigation ECU 21 searches the storage apparatus 24 so as to acquire road shape data and road surface condition data regarding a road section along which the front obstacle whose position has been determined, and supplies the acquired data to the gateway computer 40 via the LAN 50.

Upon receipt of the road shape data and the road surface condition data from the navigation ECU 21, the gateway computer 40 supplies the received data to the collision prediction ECU 11 via the bus 30. The collision prediction ECU 11 receives the supplied road shape and road surface condition data, and temporality stores them in unillustrated RAM. Subsequently, the collision prediction ECU 11 estimates the state of presence of the front obstacle; i.e., the radius of curvature R2 of the road section by use of the stored road shape data. Since the stored road shape data include data representing the number of lanes of the road section, the collision prediction ECU 11 specifies the lane on which the front obstacle is present, through use of the present relative distance Lnew and the presence direction information.

The collision prediction ECU 11 estimates the radius of curvature of the specified lane, as the radius of curvature R2 of the road section on which the front obstacle is present. When the front obstacle is moving, the collision prediction ECU 11 may estimate the radius of curvature R2 more accurately by correcting the radius of curvature R2 estimated on the basis of the road shape data, by use of the stored road surface condition data. After estimating the radius of curvature R2, the collision prediction ECU 11 proceeds to step S104.

In step S104, through utilization of a known calculation method, the collision prediction ECU 11 calculates a curve, such as a clothoid curve, which connects a curve having the radius of curvature R1 calculated in step S101 and a curve having the radius of curvature R2 estimated in step S103 with the present relative distance Lnew. Since the process of calculating a clothoid curve is known, its detailed description is omitted in the present specification; however, the calculation process will be briefly described below.

The clothoid curve refers to a curve whose curvature is proportional to the arc length thereof, and is represented by a basic formula R×L=A², where L represents the curve length from the clothoid origin to an arbitrary point P, R represents the radius of curvature at the arbitrary point P, and A represents a clothoid parameter. Such a clothoid curve having the above-described characteristics peculiar thereto has been utilized in, for example, road design, as a curve for connecting together arcs, lines, or a line and an arc.

The collision prediction ECU 11 connects the curve having the radius of curvature R1 and the curve having the radius of curvature R2 by use of the clothoid curve. Specifically, the collision prediction ECU 11 calculates a clothoid curve by use of the above-described basic formula for clothoid curves. In this case, L represents the distance between the vehicle and the front obstacle; i.e., the present relative distance Lnew, R represents the radius of curvature at the position of the front obstacle, and A is a predetermined clothoid parameter. Notably, the calculated curve is not limited to a clothoid curve. For example, the collision prediction ECU 11 may calculate a curve whose radius of curvature changes from R1 to R2 at a location corresponding to half the present relative distance Lnew. After completion of calculation of a curve, the collision prediction ECU 11 proceeds to step S105.

In step S105, the collision prediction ECU 11 calculates a curve whose radius of curvature is R3 and which passes through a point along the curve calculated in step S104, the point being ahead of the vehicle by the present relative distance Lnew. Specifically, the collision prediction ECU 11 selects a point which is located along the curve calculated in step S104 and is separated from the vehicle by the present relative distance Lnew. Subsequently, the collision prediction ECU 11 calculates a curve whose radius of curvature is R3 and which passes through the selected point and the reference point of the vehicle, and then proceeds to step S106.

In step S106, the collision prediction ECU 11 calculates a relative lateral distance Xr; i.e., a relative lateral distance between the front obstacle and the vehicle at the time when the vehicle travels along the curve whose radius of curvature is R3 by the present relative distance Lnew. Although one method for calculating the relative lateral distance Xr will be described below, various methods can be used for such calculation. In the present embodiment, the relative lateral distance Xr will be described as an offset distance between the center axis of the vehicle and a side surface of the front obstacle. Further, there will be described the case where the relative lateral distance Xr is calculated from the radius of curvature R3 of the curve along which the vehicle travels and the present relative distance Lnew between the vehicle and the front obstacle.

For calculation of the above-described relative lateral distance Xr, the collision prediction ECU 11 first detects an instantaneous relative lateral distance X between the center axis of the vehicle and the side surface of the front obstacle. Specifically, the collision prediction ECU 11 detects the relative lateral distance X by use of the present relative distance Lnew to the front obstacle and the curve having a radius of curvature R2 which is estimated in step S103 and along which the front obstacle is present, and on the basis of the presence direction (heading direction) of the front obstacle in a state in which the position and heading direction of the vehicle are used as references.

Since the detected relative lateral distance X is an instantaneous relative lateral distance X at the time of present execution of the program, it represents a relative lateral distance X in a case where the vehicle is assumed to travel straight toward the front obstacle. However, in the case where the vehicle travels while curving, at the radius R3, the vehicle does not travel straight toward the front obstacle. Therefore, the collision prediction ECU 11 calculates a correction amount on the basis of the radius of curvature R3 and the present relative distance Lnew to the front obstacle, in accordance with an equation Lnew²/(2×R3). Subsequently, the collision prediction ECU 11 corrects the detected relative lateral distance X by the correction value so as to obtain the relative lateral distance Xr. After completion of calculation of the relative lateral distance Xr, the collision prediction ECU 11 proceeds to step S108.

When the present relative distance Lnew is greater than 50 m, the collision prediction ECU 11 makes a "No" determination in step S102, and then proceeds to step S107. In step S107, in a manner similar to that in step S106, the collision prediction ECU 11 calculates a correction amount on the basis of the radius of curvature R1 calculated in step S101, in accordance with an equation Lnew²/(2×R1). Subsequently, the collision prediction ECU 11 corrects the detected relative lateral distance X by the correction value so as to obtain the relative lateral distance Xr. After completion of calculation of the relative lateral distance Xr, the collision prediction ECU 11 proceeds to step S108.

After completion of the calculation processing in step S106 or S107, in step S108, the collision prediction ECU 11 compares a predetermined distance ΔW and the relative lateral distance Xr calculated in step S106 or S107 so as to determine whether the relative lateral distance Xr is not greater than the predetermined distance ΔW. Here, the predetermined distance ΔW is determined to correspond to half the preset width of a region (the lane along which the vehicle travels) which is necessary for the vehicle to travel without colliding with the front obstacle. Specifically, when the relative lateral distance Xr is not greater than the predetermined distance ΔW, the front obstacle is present in the lane along which the vehicle travels. In this case, the collision prediction ECU 11 makes a "Yes" determination, and proceeds to step S109. In step S109, the collision prediction ECU 11 recognizes the front obstacle as a collision object with which the vehicle is highly likely to collide, and then proceeds to step S111.

Meanwhile, when the relative lateral distance Xr is greater than the predetermined distance ΔW, the front obstacle is not present in the lane along which the vehicle travels. In this case, the collision prediction ECU 11 makes a "No" determination, and proceeds to step S110. In step 1010, the collision prediction ECU 11 recognizes the front obstacle as a front object, with which the vehicle is highly unlikely to collide, and removes the front obstacle from collision objects, and then proceeds to step S11. In step S11, the collision prediction ECU 11 ends the curved-road obstacle checking routine.

Figure 4:
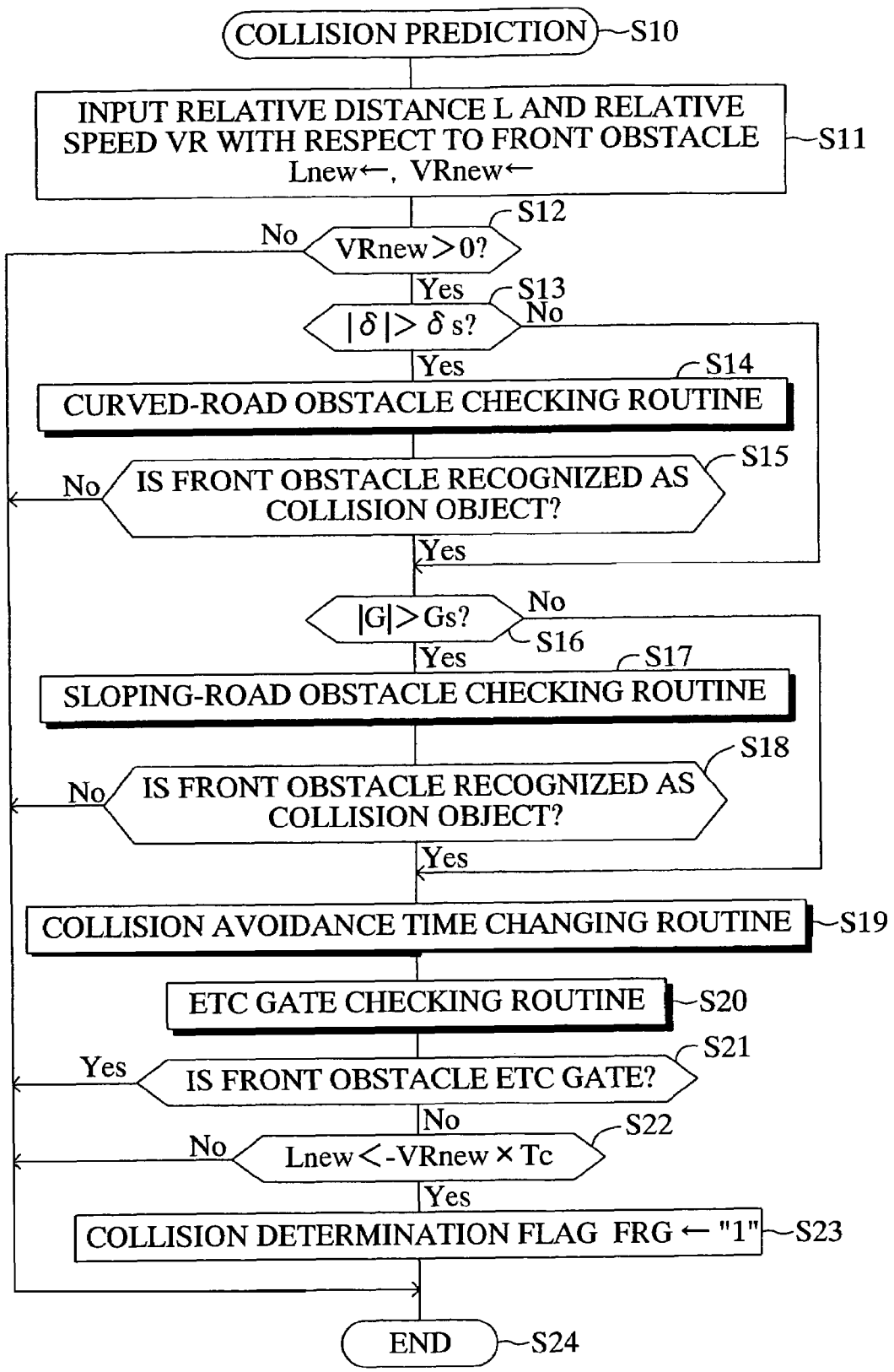
FIG. 4 is a flowchart showing a collision prediction program executed by a collision prediction ECU (microcomputer) of FIG. 2.

Referring back to the flowchart of FIG. 4, in step S15, the collision prediction ECU 11 determines whether it has recognized the front obstacle on the curved road section as a collision object. Specifically, when the collision prediction ECU 11 has removed the front obstacle from the collision objects through execution, in step S14, of the curved-road obstacle checking routine, the collision prediction ECU 11 makes a "No" determination, and proceeds to step S24 so as to end the program. When the collision prediction ECU 11 has recognized the front obstacle as a collision object, the collision prediction ECU 11 makes a "Yes" determination, and proceeds to step S16.

In step S16, the collision prediction ECU 11 determines whether the absolute value |G| of the acceleration G output from the acceleration sensor 16 is greater than a preset acceleration Gs. Through this determination, the collision prediction ECU 11 can determine whether the vehicle is currently traveling along a sloping road section. That is, when the absolute value |G| of the acceleration G is not greater than the preset acceleration Gs, the vehicle is not traveling along a sloping road section, and therefore, the collision prediction ECU 11 makes a "No" determination and proceeds to step S19.

Meanwhile, when the absolute value |G| of the acceleration G is greater than the preset acceleration Gs, the vehicle is traveling along a sloping road section, and therefore, the collision prediction ECU 11 makes a "Yes" determination and proceeds to step S17. In step S17, the collision prediction ECU 11 executes a sloping-road obstacle checking routine. This sloping-road obstacle checking routine properly selects a front obstacle with which the vehicle is highly likely to collide, among front obstacles detected by the radar sensor 15, while excluding obstacles (e.g., signboards and bridges) which are detected when a vertical motion (vibration) of the vehicle is generated, for example, upon passage of a step and with which the vehicle is highly unlikely to collide.

Figure 6:
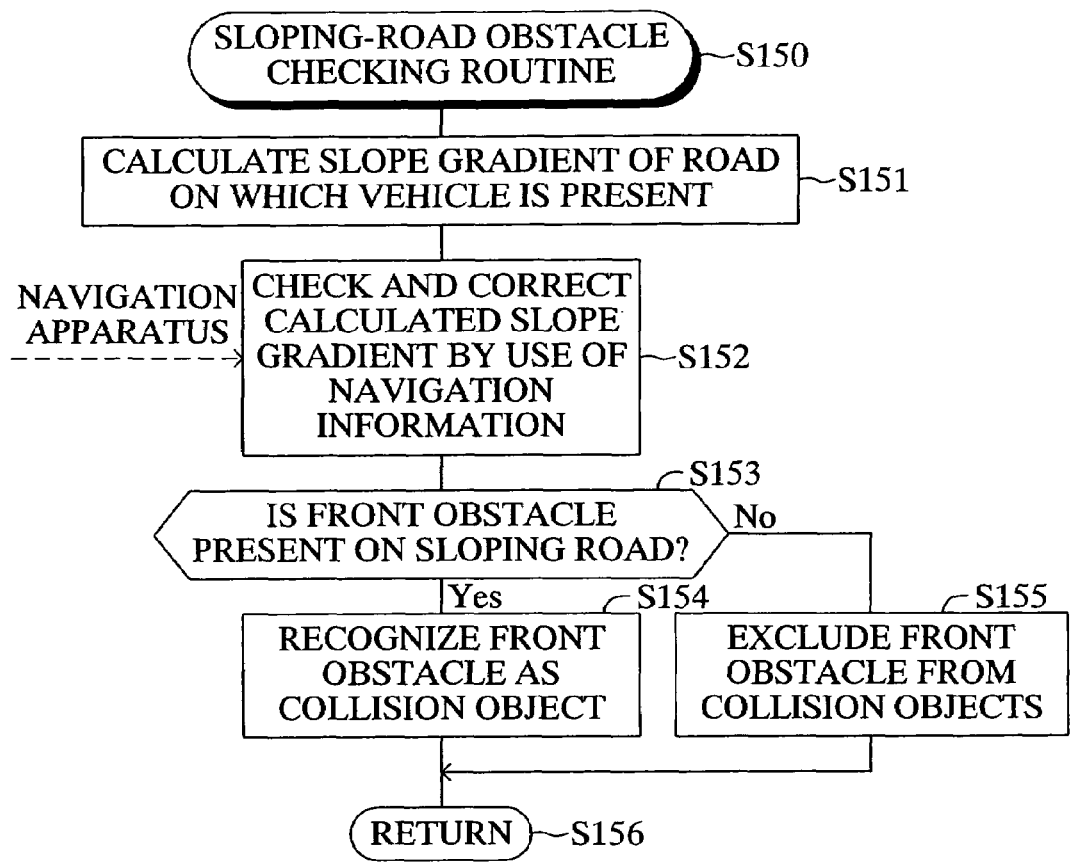
FIG. 6 is a flowchart showing a routine that the collision prediction ECU (microcomputer) of FIG. 2 performs in order to check the presence of an obstacle on a sloping road.

As shown in FIG. 6, the sloping-road obstacle checking routine is started from step S150. In step S151, the collision prediction ECU 11 calculates the slope gradient of a sloping road section along which the vehicle is currently traveling. Specifically, the collision prediction ECU 11 has a slope gradient map which stores the relation between acceleration G and slope gradient value, which increases with acceleration G. The collision prediction ECU 11 calculates a slope gradient value corresponding to the detected acceleration G with reference to the slope gradient map, and then proceeds to step S152.

In step S152, the collision prediction ECU 11 checks whether the slope gradient value calculated in step S151 is proper, by use of road gradient data of the navigation apparatus 20. Specifically, the collision prediction ECU 11 acquires from the navigation apparatus 20 road gradient data regarding a road section where the vehicle is present, and confirms that the acceleration G detected by the acceleration sensor 16 is an acceleration stemming from traveling along a sloping road section; i.e., that the acceleration G is not an acceleration stemming from a vertical motion caused by passage of a step or by acceleration and deceleration.

Here, operation of the collision prediction ECU 11 for acquiring road gradient data from the navigation apparatus 20 will be described. The navigation ECU 21 of the navigation apparatus 20 repeatedly detects the present location while the vehicle is traveling, and specifies a road on which the vehicle is present. The navigation ECU 21 searches the storage apparatus 24, and acquires road gradient data regarding the specified road. Subsequently, the navigation ECU 21 supplies the acquired road gradient data to the gateway computer 40 via the LAN 50. The gateway computer 40 supplies the supplied road gradient data to the collision prediction ECU 11 via the bus 30.

Upon receipt of the road gradient data, the collision prediction ECU 11 compares a gradient value contained in the road gradient data with the slope gradient value calculated in step S151 to thereby check whether the vehicle is present on a sloping road section. That is, when the deviation of the calculated slope gradient value from the acquired gradient value falls within a predetermined range, the collision prediction ECU 11 determines that the vehicle is present on a sloping road section. When the collision prediction ECU 11 confirms that the vehicle is present on a sloping road section, the collision prediction ECU 11 performs subsequent processing by use of the calculated slope gradient value. In the case where the deviation of the calculated slope gradient value from the acquired gradient value falls outside the predetermined range in spite of the vehicle being present on a sloping road section, the collision prediction ECU 11 corrects the calculated slope gradient value to match the acquired gradient value.

When an acceleration G is detected in spite of the vehicle being determined to be present on a horizontal road section on the basis of the gradient value contained in the road gradient data, the collision prediction ECU 11 performs subsequent processing under the assumption that the vehicle is present on a horizontal road section. Specifically, when the collision prediction ECU 11 confirms, on the basis of the gradient value contained in the road gradient data, that the vehicle is definitely present on a horizontal road section, the collision prediction ECU 11 handles the detected acceleration G as an acceleration which is generated, for example, as a result of vertical motion (vibration) of the vehicle caused by passage of a step on the road surface, and recognizes that the vehicle is present on a horizontal road section. Through the above operation, the collision prediction ECU 11 can accurately check whether the vehicle is present on a sloping road section.

After completion of the confirmation processing in step S152, in step S153, the collision prediction ECU 11 determines whether the front obstacle is present on a sloping road section. Specifically, the collision prediction ECU 11 acquires the presence direction information output from the radar sensor 15, specifies a direction in which the front obstacle is present, and compares the present relative distance Lnew; i.e., the distance between the vehicle and the front obstacle, with a road length contained in the road gradient data.

When this comparison reveals that the present relative distance Lnew; i.e., the distance between the vehicle and the front obstacle present in the specified direction, is smaller than the road length, the front obstacle is present on the sloping road section. In this case, the collision prediction ECU 11 makes a "Yes" determination, and proceeds to step S154. In step S154, the collision prediction ECU 11 recognizes the front obstacle present on the sloping road section as a collision object, with which the vehicle is highly likely to collide, and then proceeds to step S156.

Meanwhile, when this comparison reveals that the present relative distance Lnew; i.e., the distance between the vehicle and the front obstacle present in the specified direction, is greater than the road length, the front obstacle is not present on the sloping road section. In this case, the collision prediction ECU 11 makes a "No" determination, and proceeds to step S155. In step S155, the collision prediction ECU 11 recognizes the front obstacle as an object with which the vehicle is highly unlikely to collide, and removes the front obstacle from the collision objects, and then proceeds to step S156. Examples of front obstacles which are removed in this manner include bridges and signboard provided above roads. In step S156, the collision prediction ECU 11 ends the sloping-road obstacle checking routine.

Referring back to the flowchart of FIG. 4, in step S18, the collision prediction ECU 11 determines whether it has recognized the front obstacle on the sloping road section as a collision object. Specifically, when the collision prediction ECU 11 has removed the front obstacle from the collision objects through execution, in step S17, of the sloping-road obstacle checking routine, the collision prediction ECU 11 makes a "No" determination, and proceeds to step S24 so as to end the program. When the collision prediction ECU 11 has recognized the front obstacle as a collision object, the collision prediction ECU 11 makes a "Yes" determination, and proceeds to step S19.

Figure 7:
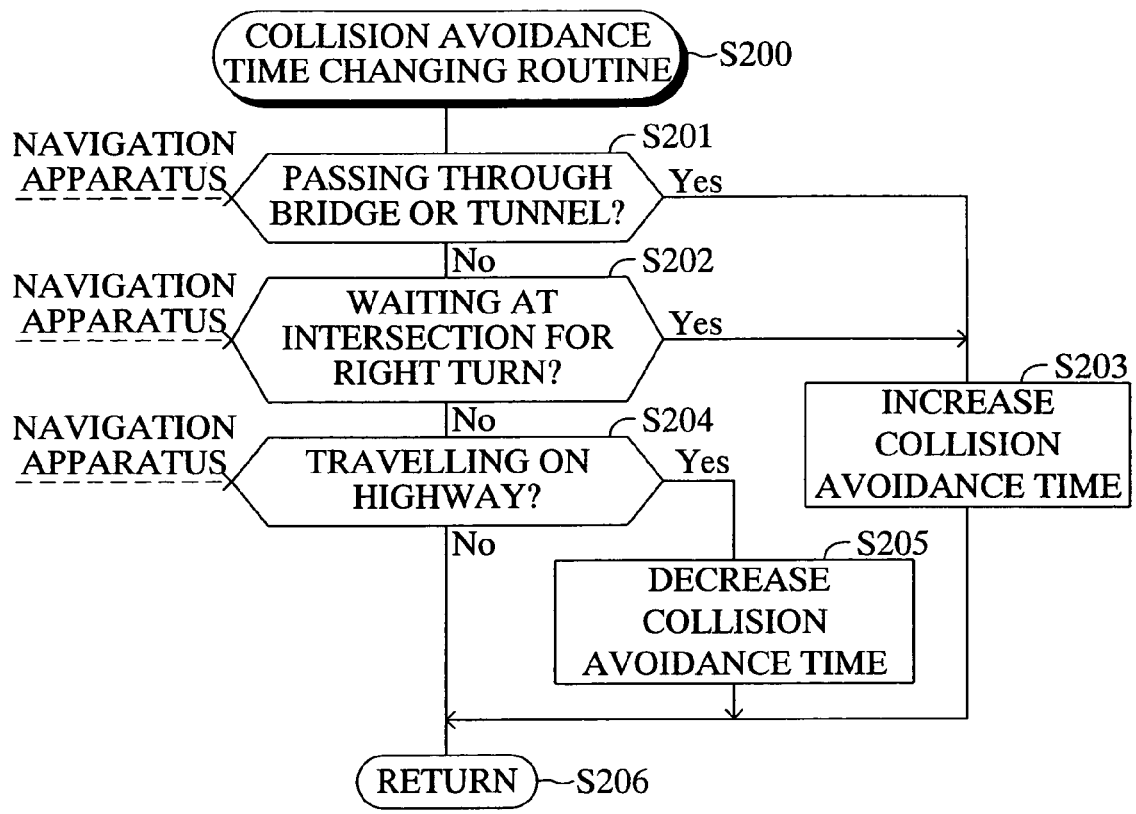
FIG. 7 is a flowchart showing a routine that the collision prediction ECU (microcomputer) of FIG. 2 performs in order to change collision avoidance time.
Figure 8:
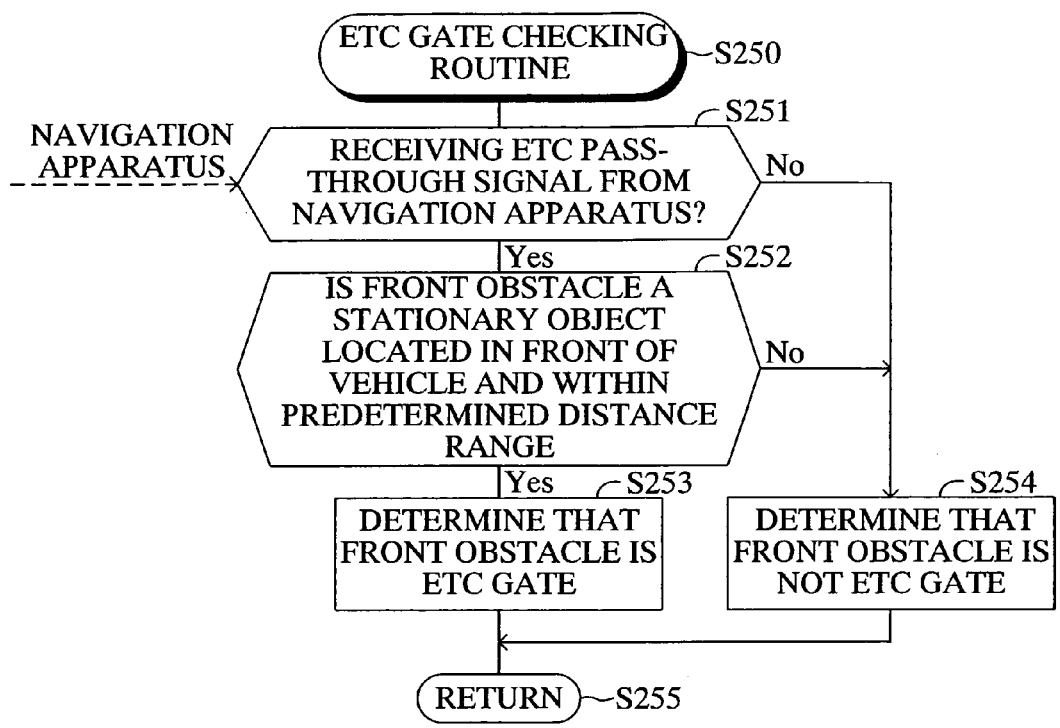
FIG. 8 is a flowchart showing a routine that the collision prediction ECU (microcomputer) of FIG. 2 performs in order to check an ETC gate.

In step S19, the collision prediction ECU 11 executes a collision-avoidance-time changing routine. As shown in FIG. 7, this collision-avoidance-time changing routine is started from step S200. In step S201, the collision prediction ECU 11 determines whether or not the vehicle is currently passing over an iron bridge or through a tunnel. Specifically, the collision prediction ECU 11 communicates with the navigation apparatus 20 via the bus 30, the gateway computer 40, and the LAN 50. Thus, the collision prediction ECU 11 acquires from the navigation ECU 21 of the navigation apparatus 20 road environment data regarding a road section along which the vehicle is currently traveling. For supplying the road environment data, the navigation ECU 21 detects the present location of the vehicle, and searches the road environment data stored in the storage apparatus 24 by use of the detected present location.

When, on the basis of the acquired road environment data, the vehicle is determined to be passing over an iron bridge or through a tunnel, the collision prediction ECU 11 makes a "Yes" determination, and proceeds to step S203. When the vehicle is not passing over an iron bridge or through a tunnel, the collision prediction ECU 11 makes a "No" determination, and proceeds to step S202. In step S202, the collision prediction ECU 11 determines whether the vehicle is waiting at an intersection to make a right turn (assuming that vehicles travel on the left side of the road).

Specifically, the collision prediction ECU 11 communicates with the navigation apparatus 20 via the bus 30, the gateway computer 40, and the LAN 50. Thus, the collision prediction ECU 11 requests the navigation ECU 21 of the navigation apparatus 20 to check whether the vehicle is currently located at an intersection. Further, the collision prediction ECU 11 acquires the vehicle speed V output from the vehicle speed sensor 12, and checks whether the vehicle is currently stopped.

Subsequently, on the basis of the results of these checking operations, the collision prediction ECU 11 determines whether the vehicle is waiting at an intersection to make a right turn. When the vehicle is waiting at an intersection to make a right turn, the collision prediction ECU 11 makes a "Yes" determination, and proceeds to step S203. In step S203, the collision prediction ECU 11 increases a collision avoidance time Tc, which represents a collision determination reference value; i.e., a time required to avoid collision between the vehicle and the front obstacle. The operation of increasing the collision avoidance time Tc is performed for the following reason. When the collision prediction ECU 11 makes a "Yes" determination in step S201 or S202, a front obstacle with which the vehicle is highly unlikely to collide is detected, and the front obstacle must be made difficult to select as a collision object.

Specifically, the radar sensor 15 detects, as a front obstacle, an iron bridge, the wall of a tunnel, or other vehicles passing in front of the vehicle waiting in order to make a right turn, in spite of low possibility that the vehicle collides with the bridge, the tunnel wall, or the passing vehicles. Therefore, there is a possibility that an erroneous determination is made in the collision determination processing in step S22, which will be described later, with the result that the occupant protection apparatus 60 operates erroneously. Therefore, in order to prevent such erroneous determination and erroneous operation, in step S203, the collision prediction ECU 11 increases the collision avoidance time Tc, which is used in the predictive collision determination processing. Subsequently, the collision prediction ECU 11 ends the present routine in step S206.

When the collision prediction ECU 11 determines in step S202 that the vehicle is not waiting at an intersection to make a right turn, the collision prediction ECU 11 makes a "No" determination, and proceeds to step S204. In step S204, the collision prediction ECU 11 determines whether the vehicle is currently traveling along a highway. Specifically, the collision prediction ECU 11 communicates with the navigation apparatus 20 via the bus 30, the gateway computer 40, and the LAN 50. Thus, the collision prediction ECU 11 acquires from the navigation ECU 21 of the navigation apparatus 20 road type data regarding the road along which the vehicle is currently traveling. For supplying the road type data, the navigation ECU 21 detects the present location of the vehicle, and searches the road type data stored in the storage apparatus 24 by use of the detected present location.

When, on the basis of the acquired road type data, the vehicle is determined to be traveling on a highway, the collision prediction ECU 11 makes a "Yes" determination, and proceeds to step S205. In step S205, the collision prediction ECU 11 decreases the collision avoidance time Tc, and then proceeds to step S206. The operation of decreasing the collision avoidance time Tc is performed for the following reason. When the determination processing in step S204 determines that the vehicle is traveling on a highway, because of high vehicle speed V, the collision avoidance time Tc must be made shorter, and the front obstacle must be made easier to select as a collision object.

Specifically, when the vehicle is traveling on a highway, the vehicle speed V is high. Therefore, a collision object must be detected in an early stage, and the predictive collision determination processing in step S22, which will be described later, must be executed properly. Therefore, the collision prediction ECU 11 shortens the collision avoidance time Tc used in the predictive collision determination processing. Meanwhile, when, on the basis of the acquired road type data, the vehicle is determined not to be traveling on a highway, the collision prediction ECU 11 makes a "No" determination, and proceeds to step S206 so as to end the collision-avoidance-time changing routine.

Referring back to the flowchart of FIG. 4, in step S20, the collision prediction ECU 11 performs a routine for checking an automatic fee settlement site; i.e., an ETC (Electronic Toll Collection) gate. This routine checks whether the front obstacle detected in the above-described respective steps is an ETC gate bar for stopping a vehicle. This checking operation is performed for the following reason. When the front obstacle detected as a collision object is an ETC gate bar, this must be removed from the collision objects, because when the vehicle passes through the ETC gate, the ETC gate bar is automatically raised, whereby collision is avoided.

This ETC gate checking routine is started from S250. In step S251, the collision prediction ECU 11 determines whether the collision prediction ECU 11 is presently receiving an ETC pass-through signal from the navigation apparatus 20. This will be described in detail. The navigation ECU 21 of the navigation apparatus 20 detects the present location of the vehicle, and determines whether the vehicle is currently present on a lane for use of the ETC gate. When the vehicle is currently present on the lane for use of the ETC gate, the navigation ECU 21 outputs the ETC pass-through signal indicating that the vehicle is currently passing through the ETC gate. The output ETC pass-through signal is supplied to the collision prediction ECU 11 via the LAN 50, the gateway computer 40, and the bus 30.

When the collision prediction ECU 11 is not receiving the ETC pass-through signal, the collision prediction ECU 11 makes a "No" determination, and proceeds to step S254. Meanwhile, when the collision prediction ECU 11 is receiving the ETC pass-through signal, the collision prediction ECU 11 makes a "Yes" determination, and proceeds to step S252. In step S252, the collision prediction ECU 11 determines whether the front obstacle is a stationary object located in front of the vehicle and within a predetermined range (for example, 30 m). That is, the collision prediction ECU 11 determines whether the front obstacle detected when the vehicle passes through the ETC lane is an ETC gate bar.

Specifically, when the vehicle passes through an ETC gate, the ETC gate bar remains closed and is located in front of the vehicle until toll-fee settlement processing ends. Therefore, the collision prediction ECU 11 checks the front obstacle on the basis of the present relative distance Lnew, the present relative speed VRnew, and the vehicle speed V. Specifically, through utilization of the present relative distance Lnew, the collision prediction ECU 11 checks whether the distance between the front end of the vehicle and the front obstacle falls within a predetermined range. Further, the collision prediction ECU 11 checks whether the front obstacle is stationary, on the basis of the present relative speed VRnew and the vehicle speed V.

When the front obstacle is determined to be present within the predetermined distance range as measured from the front end of the vehicle and to be stationary, the collision prediction ECU 11 makes a "Yes" determination, and proceeds to step S253. In step S253, the collision prediction ECU 11 determines that the front obstacle is an ETC gate bar. Meanwhile, when the front obstacle is determined not to be present within the predetermined distance range as measured from the front end of the vehicle or to not be stationary, the collision prediction ECU 11 makes a "No" determination, and proceeds to step S254. In step S254, the collision prediction ECU 11 determines that the front obstacle is not an ETC gate bar. After completion of the processing in step S253 or S254, the collision prediction ECU 11 proceeds to step S255. In step S255, the collision prediction ECU 11 ends the ETC gate checking routine.

Referring back to the flowchart of FIG. 4, in step S21, the collision prediction ECU 11 determines whether it has recognized the front obstacle as an ETC gate bar. Specifically, when the collision prediction ECU 11 has determined that the front obstacle is an ETC gate bar through execution of the ETC gate checking routine in step S20, the collision prediction ECU 11 makes a "Yes" determination, and proceeds to step S24 so as to end the program. The reason why this program is ended is that since the front obstacle is an ETC gate bar, collision between the vehicle and the front obstacle is automatically avoided.

Meanwhile, when the front obstacle is not an ETC gate bar, the collision prediction ECU 11 makes a "No" determination, and proceeds to step S22. In step S22, the collision prediction ECU 11 determines the possibility of collision between the vehicle and the detected front obstacle. Specifically, the collision prediction ECU 11 compares the present relative distance Lnew and a distance calculated through multiplication of the collision avoidance time Tc by the present relative speed VRnew, to thereby determine whether the vehicle will collide with the front obstacle.

Specifically, the collision prediction ECU 11 predicts a moving distance of the vehicle by multiplying the collision avoidance time Tc by the present relative speed VRnew, and predicts a collision between the vehicle and the front obstacle through comparison between the predicated moving distance and the present relative distance Lnew. When the present relative distance Lnew is greater than the predicated moving distance, the collision prediction ECU 11 makes a "No" determination, and proceeds to step S24 so as to end the program. Meanwhile, when the present relative distance Lnew is less than the predicated moving distance, the collision prediction ECU 11 makes a "Yes" determination, and proceeds to step S23. Notably, the method for predictive collision determination is not limited to the above-described method, and various predictive collision determination methods can be conceived. Therefore, needless to say, predictive collision determination can be executed by use of any one of other predictive collision determination methods.

In step S23, the collision prediction ECU 11 sets a collision determination flag FRG used for instructing operation of the occupant protection apparatus 60 to "1," which indicates operation of the occupant protection apparatus 60. Subsequently, the collision prediction ECU 11 outputs to the bus 30 the collision determination flag FRG set to "1." The reason for setting the flag to "1" is that the occupant protection apparatus 60 must be operated in order to avoid collision between the vehicle and the front obstacle or protect occupants when the collision is unavoidable.

When the collision determination flag FRG set to "1" is output to the bus 30, the occupant protection apparatus 60 acquires the collision determination flag FRG. Subsequently, the occupant protection apparatus 60 operates the respective apparatuses; e.g., operates the ABS and the traction control so as to control the state of traveling of the vehicle to thereby avoid the collision, and/or controls operation of the pedal moving apparatus and operation of the cutoff circuit, etc., to thereby mitigate the damage to occupants caused by the collision. After completion of the processing in step S23, the collision prediction ECU 11 proceeds to step S24 so as to end the program.

As can be understood from the above description, the collision prediction ECU 11 of the collision prediction apparatus 10 according to the first embodiment can accurately estimate the state of presence of a front obstacle; i.e., the radius of curvature R2 of a curve where the front obstacle is present. Further, the collision prediction ECU 11 can check and accurately correct a parameter which indicates the sate of traveling of the vehicle; i.e., acceleration G detected by the acceleration sensor 16. This estimation and correction can be performed on the basis of various types of data supplied from the navigation apparatus 20; i.e., road shape data, road surface condition data, and road gradient data.

Moreover, the collision prediction ECU 11 can increase the collision avoidance time Tc, which serves as a collision determination reference value, when the vehicle travels on a road section along which a stationary object (the wall of a tunnel, etc.) is disposed or when the vehicle starts traveling from a state in which it is waiting at an intersection to make a right turn. Increasing the collision avoidance time Tc makes the front obstacle difficult to select, during the predictive collision determination, as a collision object with which the vehicle is highly likely to collide. By virtue of this operation, a stationary object which is continuously detected as a front obstacle, or another vehicle passing in front of the vehicle at the time of waiting to make a right turn, can be excluded as a front obstacle with which the vehicle is unlikely to collide. Accordingly, erroneous determination, which would otherwise occur in prediction of collision with these front obstacles, can be reduced greatly.

Moreover, the collision prediction ECU 11 can decrease the collision avoidance time Tc when the vehicle travels on a highway. Decreasing the collision avoidance time Tc makes the front obstacle easy to select, during the predictive collision determination, as a collision front object with which the vehicle is highly likely to collide. By virtue of this operation, when the vehicle travels on a highway, a front obstacle with which the vehicle is highly likely to collide can be detected in an early stage, and predictive collision determination can be performed properly. Accordingly, for example, the occupant protection apparatus 60 can be operated at a proper timing on the basis of the results of the predictive collision determination.

Furthermore, when the vehicle passes through an ETC gate, the collision prediction ECU 11 can detect an ETC gate bar which is present in front of the vehicle so as to stop the vehicle. When the front obstacle is determined to be an ETC gate bar, the collision prediction is stopped, whereby an erroneous determination that the vehicle will collide with the ETC gate bar can be prevented, and thus, the accuracy of the predictive collision determination can be improved.

In the above-described embodiment, the collision prediction ECU 11 is configured to check the presence of a front obstacle on a curved road section, the slope gradient of a road section where the vehicle is present, and the travel environment of the vehicle on the basis of road data previously stored in the storage apparatus 24 of the navigation apparatus 20 mounted on the vehicle.

However, the navigation apparatus 20 may be configured so as to communicate with the outside (for example, with an information providing center or a traffic information providing center) in order to acquire the latest travel-related information, and so as to supply the acquired latest travel-related information to the collision prediction ECU 11. This second embodiment will be described in detail; however, portions identical with those of the first embodiment are denoted by the same reference numerals, and their repeated descriptions are omitted.

Figure 9:
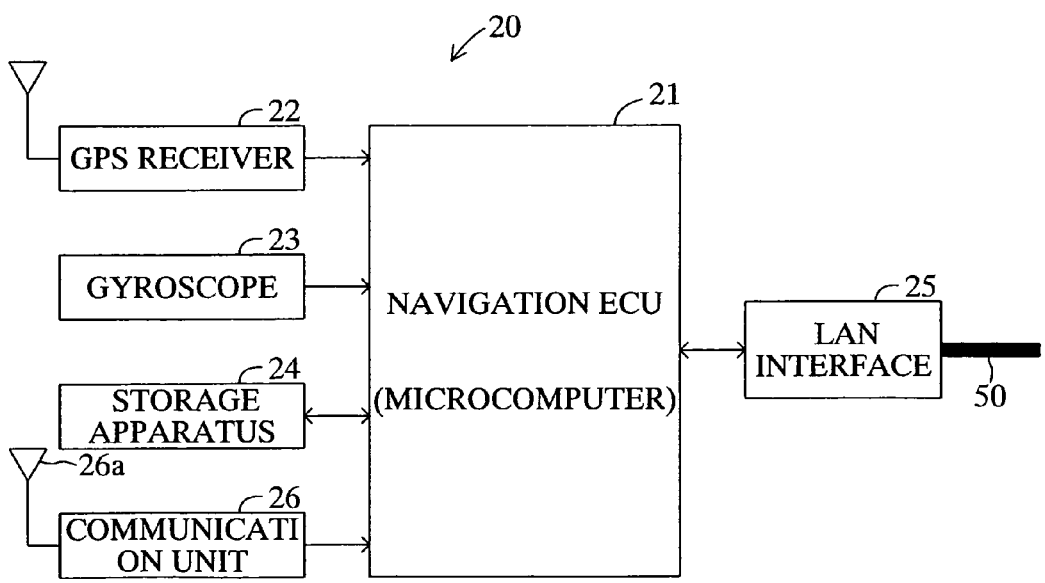
FIG. 9 is a block diagram schematically showing a navigation apparatus according to a second embodiment of the present invention.

As shown in FIG. 9, a navigation apparatus 20 according to the second embodiment has a communication unit 26, which enables the navigation apparatus 20 to communicate with the outside. The communication unit 26 is connected to the navigation ECU 21, and communicates with the outside at predetermined intervals to thereby acquire the latest travel-related information. Therefore, the communication unit 26 has an antenna 26a for radio communications with the outside. Examples of such latest travel-related information include information regarding traffic congestion and weather near the present location of the vehicle, or traffic accident information reporting that many accidents have occurred along a road on which the vehicle is presently traveling. Other usable examples of communications between the communication unit 26 and the outside include communications between the vehicle and other vehicles (inter-vehicle communications) and communications between the vehicle and roads (road-vehicle communications).

The latest travel-related information acquired by the communication unit 26 is supplied to the navigation ECU 21. The navigation ECU 21 stores the supplied latest travel-related information in an predetermined storage area of unillustrated RAM, and then supplies that information to the storage apparatus 24. The storage apparatus 24 stores the supplied latest travel-related information in an predetermined storage area of, for example, a hard disk.

In the second embodiment configured as described above as well, the collision prediction ECU 11 executes the collision prediction program shown in FIGS. 4 to 8. Specifically, the collision prediction ECU 11 executes the curved-road obstacle checking routine in step S14 of FIG. 4. In step S103 of the curved-road obstacle checking routine shown in FIG. 5, the collision prediction ECU 11 acquires road shape data, road surface condition data, and the latest travel-related information from the navigation ECU 21 of the navigation apparatus 20. Since the collision prediction ECU 11 acquires the latest travel-related information, through utilization of weather information contained in the latest travel-related information, the collision prediction ECU 11 can execute more accurately the calculation of the radius of curvature R2 in step S103, the calculation of the radius of curvature R3 and the relative lateral distance Xr in steps S104 to S106, and the determination as to presence of a front obstacle in step S108.

As can be understood from the above description, since the collision prediction ECU 11 of the collision prediction apparatus 10 according to the second embodiment can correct the parameters that represent the state of traveling of the vehicle on the basis of the latest travel-related information (e.g., weather information), the collision prediction ECU 11 can recognize a front obstacle more accurately. Accordingly, the collision prediction ECU 11 can more accurately predict the probability of occurrence of a collision between the vehicle and a front obstacle.

The embodiments of the present invention have been described above. However, the present invention is not limited to the embodiments and modifications thereof, and various modifications may be practiced without departing from the scope of the present invention.

For example, in the first and second embodiments, the collision prediction apparatus 10 and the navigation apparatus 20 are provided in order to practice the present invention. However, in a vehicle which is not equipped with the navigation apparatus 20, a navigation function may be incorporated into the collision prediction apparatus 10.

Figure 10:
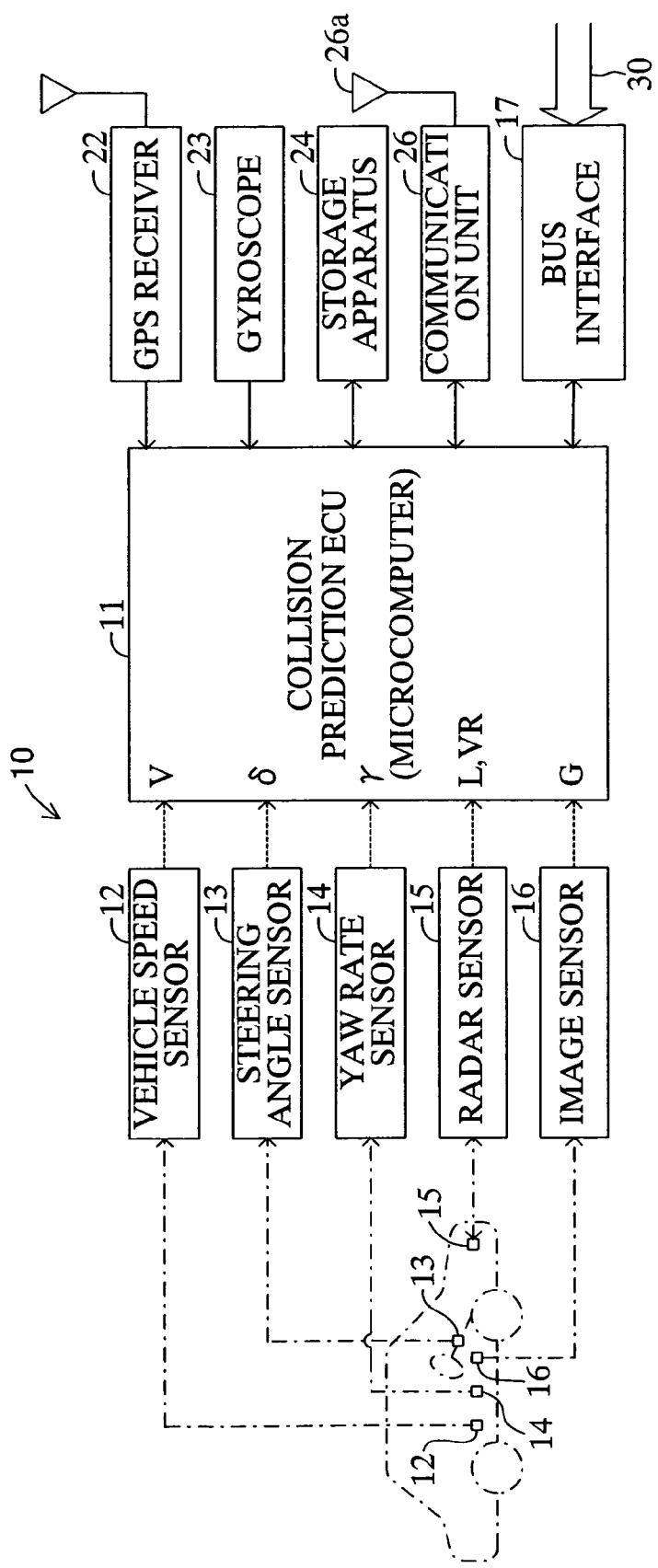
FIG. 10 is a block diagram schematically showing a collision prediction apparatus according to a modification of the first and second embodiments of the present invention.

This modification will be described specifically with reference to FIG. 10. The GPS receiver 22, the gyroscope 23, the storage apparatus 24 of the navigation apparatus 20, as well as the communication unit 26 are connected to the collision prediction ECU 11 of the collision prediction apparatus 10. This configuration enables the collision prediction ECU 11 to directly obtain the present location of the vehicle, road data, latest information, etc., and execute the collision prediction program shown in FIGS. 4 to 8 by use of these data and information.

Therefore, in this case as well, effects similar to those of the first and second embodiments can be attained. Moreover, since a mounting space for mounting the navigation apparatus 20 on the vehicle is not required, the collision prediction system can be made compact.

Figure 11:
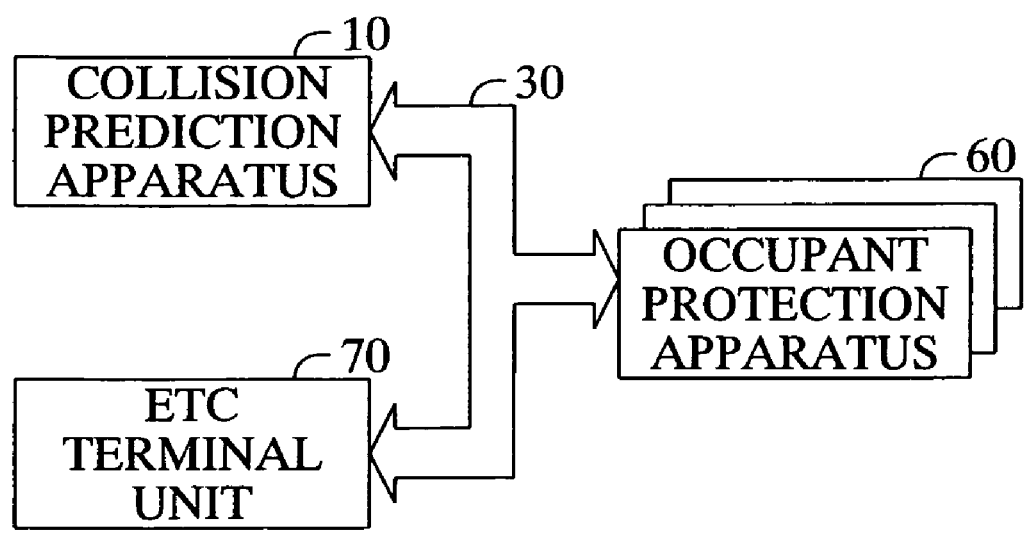
FIG. 11 is a block diagram schematically showing a collision prediction system according to a modification of the first and second embodiments of the present invention.

In the first and second embodiments, the collision prediction apparatus 10 is configured to determine whether the vehicle is currently passing through an ETC gate, by acquiring an ETC pass-through signal from the navigation apparatus 20. However, the collision prediction apparatus 10 may be configured to acquire an ETC pass-through signal from an ETC terminal unit which is mounted on the vehicle and adapted to automatically settle toll fees. This modification will be described with reference to FIG. 11; however, since the details of operation of the ETC terminal unit do not relate directly to the present invention, its detailed description is omitted.

When the vehicle approaches an ETC gate with a predetermined distance remaining therebetween, an ETC terminal unit 70 receives a wave transmitted from an ETC main computer provided at the ETC gate. Subsequently, the ETC terminal unit 70 transmits to the ETC main computer information (e.g., information regarding a traveled section of highway, and information regarding the amount of money remaining on a settlement card) necessary for settlement of toll fees. The ETC terminal unit 70 is connected to the bus 30 in order to supply an ETC pass-through signal to the collision prediction apparatus 10.

Upon receipt of a wave transmitted from the ETC main computer, the ETC terminal unit 70 supplies an ETC pass-through signal to the collision prediction ECU 11 via the bus 30. The collision prediction ECU 11 acquires the ETC pass-through signal supplied from the ETC terminal unit 70. Thus, the collision prediction ECU 11 can determine whether the vehicle is passing through an ETC gate. Accordingly, in this modification as well, effects similar to those of the first and second embodiments can be attained.

What is claimed is:

1. A collision prediction apparatus mounted on a vehicle, the collision prediction apparatus comprising:
    a front obstacle detection unit configured to detect a front obstacle present on a route of travel of the vehicle and adapted to predictively determine whether the vehicle will collide with the detected front obstacle as a result of traveling of the vehicle;
    a road information acquisition unit configured to acquire road information regarding a road on which the detected front obstacle is present;
    a navigation apparatus mounted on the vehicle configured to store road information, and provide the road information to the road information acquisition unit, the road information comprising at least one of road type data selected from the group consisting of highway information, interstate information, and state route information, and road environment data selected from the group consisting of tunnel information and bridge information;
    a parameter value detection unit configured to detect a parameter value representing a state of traveling of the vehicle;
    a parameter value correction unit which corrects, on the basis of the road information, the parameter value detected by the parameter value detection unit;
    a predictive collision determination unit which is configured to calculate a first radius of a road on which the vehicle is present, calculate a relative distance between the vehicle and the front obstacle, calculate a first relative lateral distance based on the first radius, calculate a second radius of the road on which the detected front obstacle is present, calculate a clothoid curve connecting the first radius and the second radius, calculate a third radius of a curve passing through a point on the clothoid curve separated from the vehicle by the relative distance, calculate a second relative lateral distance based on the third radius, and determine whether the vehicle, whose state of traveling is represented by the corrected parameter value, will collide with the front obstacle detected by the front obstacle detection unit; and
    a vehicle occupant protection unit configured to, as a result of the collision prediction, perform at least one of automatically rotating a steering wheel, optimizing operation of an airbag, moving operation pedals forward, and cutting off power to units other than the vehicle occupant protection unit.

2. A collision prediction apparatus according to claim 1, wherein
    the road information acquired by the road information acquisition unit is road shape information representing a shape of the road;
    a presence state estimation unit estimates a heading direction of the front obstacle on the basis of the road shape information when the presence state estimation unit estimates that the front obstacle detected by the front obstacle detection unit is moving; and
    the predictive collision determination unit predictively determines whether the vehicle will collide with the front obstacle, by use of the estimated heading direction of the front obstacle.

3. A collision prediction apparatus according to claim 2, wherein the road shape information includes information regarding a curved road.

4. A collision prediction apparatus according to claim 2, wherein the road shape information includes information regarding a gradient of a road.

5. A collision prediction apparatus according to claim 2, wherein the predictive collision determination unit predictively determines a manner of a collision between the vehicle and the front obstacle, in addition to predictively determining whether the vehicle will collide with the front obstacle.

6. A collision prediction apparatus according to claim 1, wherein
    the road information acquired by the road information acquisition unit is road shape information representing a shape of the road;
    the parameter value correction unit corrects, on the basis of the road shape information, a parameter value regarding a heading direction of the vehicle; and
    a predictive collision determination unit predictively determines whether the vehicle will collide with the front obstacle, taking into consideration the corrected parameter value regarding the heading direction.

7. A collision prediction apparatus according to claim 6, wherein the road shape information includes information regarding a curved road.

8. A collision prediction apparatus according to claim 6, wherein the road shape information includes information regarding a gradient of a road.

9. A collision prediction apparatus according to claim 6, wherein the predictive collision determination unit predictively determines a manner of a collision between the vehicle and the front obstacle, in addition to predictively determining whether the vehicle will collide with the front obstacle.

10. A collision prediction apparatus according to claim 6, wherein the parameter value regarding the heading direction of the vehicle is at least one of a parameter value representing a turning direction of the vehicle and a parameter value representing an inclination direction of the vehicle.

11. A collision prediction apparatus according to claim 1, further comprising a travel-related-information acquisition unit configured to acquire, from the outside, travel-related information regarding travel conditions of the vehicle, wherein
    the parameter value correction unit corrects the parameter value on the basis of not only the road information but also the travel-related information acquired by the travel-related-information acquisition unit.

12. A collision prediction apparatus according to claim 1, wherein the navigation apparatus mounted on the vehicle comprises at least a present location detection unit detecting a present location of the vehicle, and a storage unit storing the road information in a retrievable manner.

13. A collision prediction apparatus according to claim 1, wherein the front obstacle detection unit is formed of a millimeter-wave radar which is provided at a front end portion of the vehicle and which detects the front obstacle on the basis of a period of time between transmission of a millimeter wave and receipt of the wave.

14. A collision prediction apparatus according to claim 1, wherein the vehicle occupant protection unit also decreases vehicle speed as a result of the collision prediction.

15. A collision prediction apparatus according to claim 1, wherein the vehicle occupant protection unit also assists driver brake pedal depressing force.

16. A collision prediction apparatus according to claim 1, wherein the vehicle occupant protection unit also prevents advance movement of an occupant of the vehicle at a time of collision.

* * * * *